United States Patent
Fujii

(10) Patent No.: US 9,854,131 B2
(45) Date of Patent: Dec. 26, 2017

(54) IMAGE FORMING APPARATUS WITH PERSONAL SETTING SYNCHRONIZATION AND METHOD FOR CONTROLLING SAME

(71) Applicant: CANON KABUSHIKI KAISHA, Tokyo (JP)

(72) Inventor: Manabu Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/044,346

(22) Filed: Feb. 16, 2016

(65) Prior Publication Data
US 2016/0261771 A1 Sep. 8, 2016

(30) Foreign Application Priority Data
Mar. 3, 2015 (JP) ................. 2015-041778

(51) Int. Cl.
*H04N 1/00* (2006.01)
*H04N 1/44* (2006.01)

(52) U.S. Cl.
CPC ....... *H04N 1/4413* (2013.01); *H04N 1/00244* (2013.01); *H04N 1/00509* (2013.01); *H04N 1/00514* (2013.01); *H04N 2201/0094* (2013.01)

(58) Field of Classification Search
CPC combination set(s) only.
See application file for complete search history.

(56) References Cited

U.S. PATENT DOCUMENTS

| 2009/0238213 A1* | 9/2009 | Kasatani | H04N 1/00344 370/503 |
| 2012/0327442 A1* | 12/2012 | Nakahara | G06F 13/12 358/1.13 |
| 2014/0215454 A1* | 7/2014 | Fujii | G06F 8/61 717/174 |
| 2015/0229809 A1* | 8/2015 | Fujii | H04N 1/4406 358/1.16 |
| 2016/0173931 A1* | 6/2016 | Eber | H04N 21/242 725/38 |

FOREIGN PATENT DOCUMENTS

JP 2011-170203 A 9/2011

* cited by examiner

*Primary Examiner* — Benjamin O Dulaney
(74) *Attorney, Agent, or Firm* — Fitzpatrick, Cella, Harper & Scinto

(57) ABSTRACT

Personal settings for each user and each application are stored in personal setting holding units 311 and 310. When a personal setting is to be exported, synchronous control information indicating whether or not synchronization is to be performed for each personal setting is exported. In the case where the firmware version of an apparatus that is to import the information indicates synchronization of the personal setting, the personal setting is rewritten in accordance with the synchronous control information.

10 Claims, 18 Drawing Sheets

F I G. 16
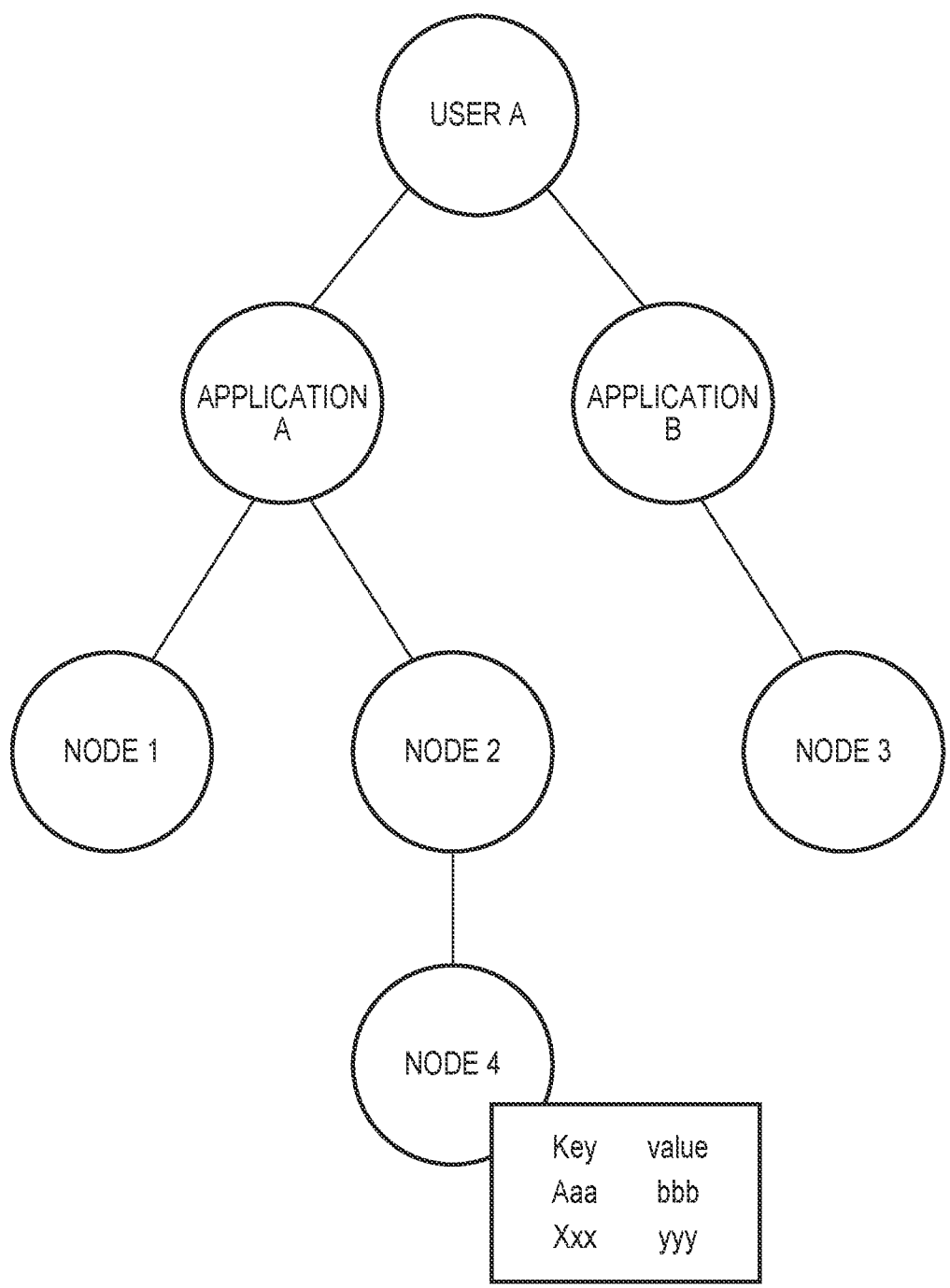

F I G. 18

| | | | |
|---|---|---|---|
| appinfo1 | xxxxxxxx-xxxx-xxxx-xxxx-xxxxxxxxxxxx | Application A | Installed | LoginService |
| appinfo2 | yyyyyyyy-yyyy-yyyy-yyyy-yyyyyyyyyyyy | Application B | Started | SystemService |
| appinfo3 | zzzzzzzz-zzzz-zzzz-zzzz-zzzzzzzzzzzz | Application C | Starting | Normal |
| appinfo4 | aaaaaaaa-aaaa-aaaa-aaaa-aaaaaaaaaaaa | EXTENSION PASSWORD INFORMATION MANAGEMENT UNIT | Started | SystemService |

IMAGE FORMING APPARATUS WITH PERSONAL SETTING SYNCHRONIZATION AND METHOD FOR CONTROLLING SAME

BACKGROUND OF THE INVENTION

Field of the Invention

The present invention relates to an image forming apparatus and a method for controlling the same, and in particular relates to synchronous control of setting values and the like.

Description of the Related Art

Some image forming apparatuses such as printers, copiers, and multifunction machines perform log-in processing involving user authentication at the time of usage and can only be used by permitted users. In some of these image forming apparatuses, after the login processing, a usage environment (desktop layout, copy density, type of sheets to be used, and the like) corresponding to the permitted user is set based on personal settings of that user. Japanese Patent Laid-Open No. 2011-170203 describes a technique that can eliminate the time and effort involved in performing settings for each image forming apparatus by centrally managing the personal settings of users on a server, and, in the case where a user logs in to an image forming apparatus, downloading the personal settings of the login user from the server.

However, with the method of Japanese Patent Laid-Open No. 2011-170203, it was not possible to collectively change whether or not the server is used in accordance with the version of firmware, or for an application to freely select whether or not the server is used. For example, the image forming apparatuses include applications that transmit document data to an external server, and manage password information used when accessing the external server as personal settings. However, there are cases where needlessly managing such confidential information centrally on the server is not preferable in terms of security. Therefore, it is desirable that each application can select whether the information is managed on a server, or is only managed locally.

Also, enabling collective control of such selection in accordance with the version of firmware makes it possible to more flexibly meet the demands of customers. For example, in Ver.3.2.x firmware, security is important, and password information of all applications is prohibited from being managed by a server. On the other hand, in Ver.3.3.x firmware, user-friendliness is important, and password information of all applications is managed centrally on the server, thus enabling collective control by providing firmware according to the customer. That is, it is sought to control whether or not a server for centrally managing information is used, in accordance with a designation from an application and the version of firmware. Moreover, in the case where setting values are distributed among machines having different versions of firmware, or the firmware is updated on one image forming apparatus, whether or not the server is used needs to be collectively controlled in accordance with the change of firmware.

SUMMARY OF THE INVENTION

The present invention provides an image forming apparatus and a method for controlling the same according to which an application can freely select whether or not personal settings installed on the image forming apparatus and personal settings held in a server are synchronized, and that are able to collectively change whether or not such synchronization is performed, in accordance with the version of firmware of the image forming apparatus.

The present invention has the following configurations.

According to an aspect of the present invention, there is provided an image forming apparatus configured to be connected to an external apparatus, comprising: a storing unit configured to store a personal setting of each program in association with synchronous control information; a synchronization management unit configured to synchronize the personal setting stored in the storing unit and a corresponding personal setting held in the external apparatus, in accordance with the synchronous control information associated with the personal setting; and an export unit configured to export the synchronous control information in association with the personal setting, when the personal setting is exported to a distribution destination.

According to the present invention, an application can freely select whether or not the personal settings of an image forming apparatus are synchronized with those of a server, and whether or not such synchronization is performed can be collectively changed in accordance with the version of firmware.

Further features of the present invention will become apparent from the following description of exemplary embodiments with reference to the attached drawings.

BRIEF DESCRIPTION OF THE DRAWINGS

FIG. 16 shows a data structure of personal settings according to the embodiment.

FIG. 18 shows an example of the application list according to the embodiment.

DESCRIPTION OF THE EMBODIMENTS

Figure 1:
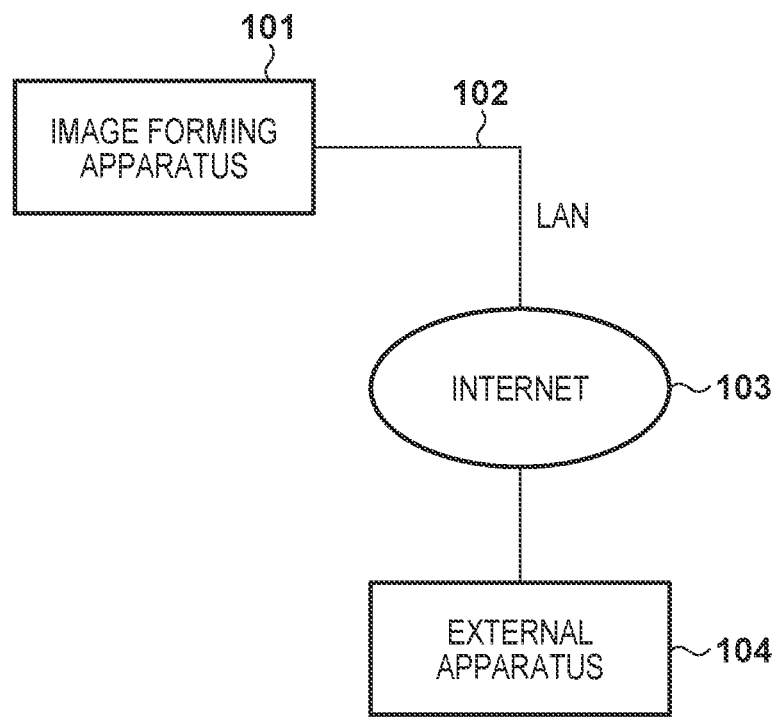
FIG. 1 is a system configuration diagram of an image forming apparatus according to an embodiment.

Hereinafter, an example of modes for carrying the present invention will be described with reference to the drawings.

Definitions of Terms

First, terms in the present invention will be defined.

"Setting value" indicates a parameter that is set in an image forming apparatus and with which an operation of the image forming apparatus is switched.

"Embedded program" indicates a program such as an application program originally embedded in an image forming apparatus. Usually, a user is not allowed to install or uninstall embedded programs.

"Extension program" indicates a program that a user can install later, such as a Java (registered trademark) application. Extension programs include applications developed by not only the company operating the image forming apparatus but also a third-party vendor or the like.

"Distribution" indicates that setting values of a given image forming apparatus are retrieved and loaded into another image forming apparatus. There are cases where processing for retrieving setting values from an image forming apparatus is referred to as "export" and processing for loading setting values into an image forming apparatus is referred to as "import", and described distinctly from each other. "Export" encompasses transmission of information targeted for export to a designated apparatus and writing of the information into a designated medium. "Import" encompasses reception of information targeted for import from a designated apparatus and reading of the information from a designated medium.

"Synchronization" indicates that setting values to be used by an image forming apparatus are centrally managed on a server and downloaded to the image forming apparatus when a user logs in, and that data is updated when the user logs out is uploaded to the server.

"Personal settings" indicate setting values customized for each user who uses the image forming apparatus. FIG. 16 shows a data structure of personal settings handled in the present embodiment. The personal settings are managed in a tree structure as shown in FIG. 16. An identifier for identifying a user is designated in a root node of the tree structure. A node for each application is created in child nodes of the root node. Moreover, each application can freely create nodes to the child node thereof. The personal settings are registered in the nodes in a property format.

"Password information" indicates confidential information of the personal settings, such as passwords in particular. The password information is included in the personal settings. Specific examples of the password information include WebDAV passwords and passwords used at the time of URL and SMTP authentication.

The terms have been described above. In addition to the description above, terms will be described as appropriate.

First Embodiment

The present embodiment is an embodiment in the case where setting values are distributed to a plurality of image forming apparatuses having different versions of firmware. In the present embodiment, in order to simplify description, the version of firmware and the state of synchronous control will be defined as follows.

Ver3.2: do not synchronize

Ver3.3: synchronize

Figure 3:
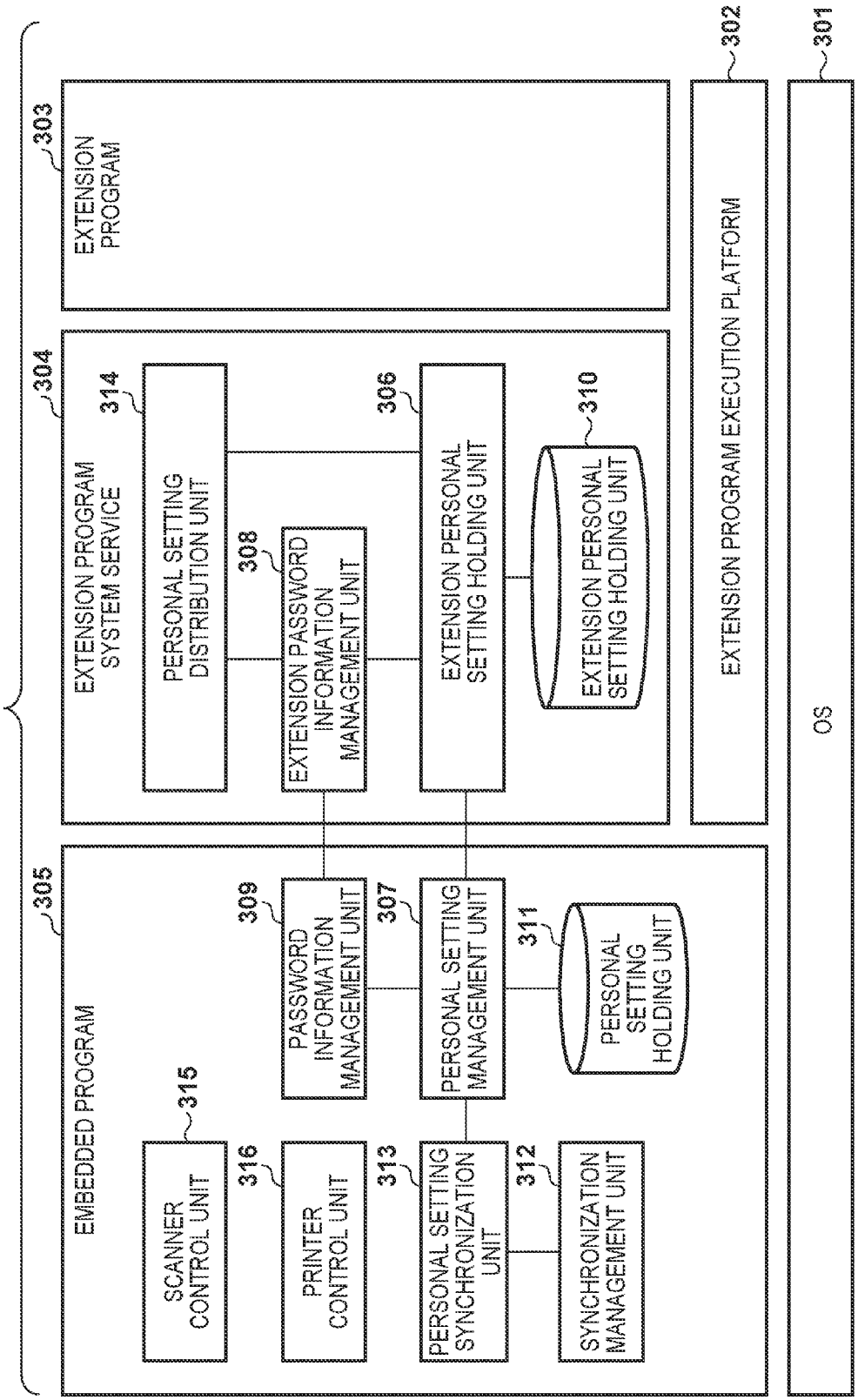
FIG. 3 is a software configuration diagram of the image forming apparatus of the embodiment.

Note that firmware herein includes a portion of blocks, shown in FIG. 3, excluding extension programs and an OS, for example.

That is, even if the personal settings, which are acquired from a server, of a user who is logged in to an image forming apparatus on which Ver3.2 firmware has been installed have been changed in the image forming apparatus, the image forming apparatus does not reflect the change in the personal settings on the server. On the other hand, if personal settings, which are acquired from the server, for example, of a user who is logged in to an image forming apparatus on which Ver3.3 firmware has been installed are changed in the image forming apparatus and the user logs out, the image forming apparatus reflects the changed personal settings in the personal settings on the server. The version information thus has significance as information indicating a synchronous control method in the present embodiment and other embodiments. Note that the reason why synchronous control is changed depending on the version of firmware is that introducing firmware of a different version in accordance with the demands of customers makes it possible to change synchronous control collectively. Also, the association between the version and synchronous control here is merely an example, and the present invention is not particularly limited to this combination.

In the case where setting values are distributed from a Ver3.2 image forming apparatus to a Ver3.3 image forming apparatus, it is necessary to change synchronous control as appropriate in accordance with the distribution. The flow thereof will be described in the present embodiment. A system configuration of the present embodiment will be described with reference to FIG. 1.

An image forming apparatus 101 is a digital multifunction image forming apparatus in which a printing function, a copying function, a facsimile function, and a transmission function (e-mail, FTP, and the like) are integrated or an image forming apparatus such as a printer, a scanner, or a facsimile. Also, the image forming apparatus 101 is provided with various setting values for each function, and the functions operate based on the setting values. A LAN 102 is a local area network. The image forming apparatus 101 can be connected to other image forming apparatuses (not shown) or an Internet 103 via the LAN 102. The Internet 103 may be realized by a network such as a single Wide Area Network (WAN), Local Area Network (LAN), or ad-hoc network. Also, the Internet 103 may be constituted by a plurality of WANs, LANs, and ad-hoc networks combined as required. Also, the Internet of the present embodiment is merely an example, and the Internet may be another communication network, or combination of networks. An external apparatus 104 is an external device that manages the setting values of the image forming apparatus 101. Although the external apparatus is assumed to be an external server connected to the image forming apparatus 101 via the Internet 103 in the present embodiment, it may be an internal server or the like connected via the LAN 102.

Hardware Configuration

Figure 2:
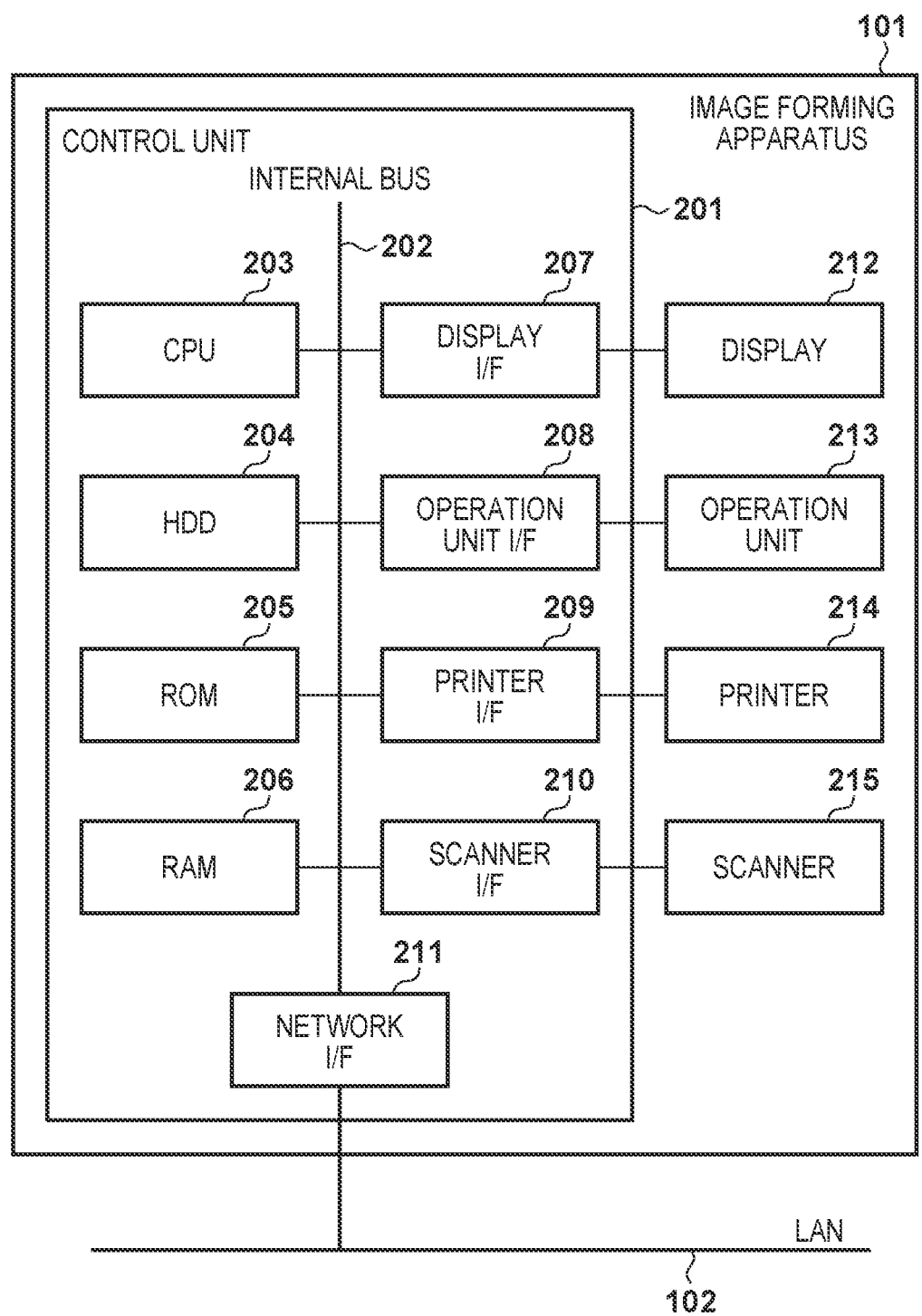
FIG. 2 is a hardware configuration diagram of the image forming apparatus of the embodiment.

A hardware configuration of the present embodiment will be described with reference to FIG. 2. A control unit 201 performs overall control of the image forming apparatus 101. An internal bus 202 connects constituent elements of hardware. A CPU 203 executes a control program stored in a ROM 205. A HDD 204 is a non-volatile storage area and holds personal settings, operation logs, and the like. A ROM 205 is a read-only non-volatile storage area and holds a control program and the like of the image forming apparatus 101. A RAM 206 is a work memory area for executing a program and is used as a temporary storage area or the like.

A display I/F 207 connects a display 212 and the control unit 201. An operation unit I/F 208 connects an operation unit 213 and the control unit 201. A printer I/F 209 connects a printer 214 and the control unit 201. A scanner I/F 210 connects a scanner 215 and the control unit 201. A network I/F 211 is an interface unit for connecting to the LAN 102 and communicates with the image forming apparatus (not shown) or the Internet 103 via the LAN 102. The display 212 displays error information or the like in accordance with user operations or the state of the image forming apparatus.

Key input portions are built into the operation unit 213, and these are controlled by the CPU 203. A user gives various setting instructions relating to scanner reading and printing output through the key input portions and start/stop instructions. Note that the operation unit 213 may be an operation unit that the user directly operates on the display 212, such as a touch panel, and is not particularly limited to keys. The printer 214 prints image data on a recording medium. The image data to be printed with the printer 214 is transferred from the control unit 201 to the printer 214 via the printer I/F 209. The scanner 215 reads an image on the original, produces image data, and transfers the resulting image data to the control unit 201 via the scanner I/F 210.

Software Configuration

FIG. 3 is a diagram of a software configuration of the image forming apparatus 101. Constituent portions shown in FIG. 3 with rectangles represent software. Note that software (that is, programs and data) of the image forming apparatus 101 is stored in the ROM 205 or the HDD 204, loaded to the RAM 206, and executed by the CPU 203. Also, various pieces of information used at the time of execution are stored in the RAM 206 or the HDD 204, and various pieces of information are exchanged between software functions. Moreover, communication with an external device is performed using the network I/F 211. The software will be described hereinafter.

An OS 301 is system software (operating system) that provides basic functions used in common by many types of application software, such as input-output functions and disk and memory management, and manages the overall system.

An extension program execution platform 302 is a platform that is required for the operation of an extension program 303 and operates on the OS 301. Applying the extension program execution platform 302 makes it possible to operate the extension program 303 independent of the OS 301. For example, a Java VM (registered trademark) on which a Java (registered trademark) application operates as the extension program 303, or the like corresponds to the extension program execution platform 302.

The extension program 303 is a program operating on the extension program execution platform 302. The extension program 303 can access modules of the image forming apparatus 101, such as another extension program 303 or RAM 205 via the extension program execution platform 302 or an extension program system service 304.

The extension program system service 304 is a program operating on the extension program execution platform 302. The extension program system service 304 is a utility library useful in common to the extension programs 303 and is provided by the system. Calling the extension program system service 304 from the extension program 303 enables a service to be available. The extension program system service 304 further includes the following configurations.

An extension personal setting management unit 306 is a program for managing personal settings handled by the extension program 303. By calling an API provided by the extension personal setting management unit 306, the extension program 303 can perform registration of personal settings or the like. An extension password information management unit 308 is a program for managing password information handled by the extension program 303. The password information is information for receiving password authentication by an external device when the external device such as a server is accessed. The password information of the extension program 303 is managed as the personal setting of the extension password information management unit 308 for each user. The extension password information management unit 308 is a wrapper that is created specifically for operation of password information, in particular, among the functions of the extension personal setting management unit 306. An extension personal setting holding unit 310 is a database that holds personal settings handled by the extension program 303. The personal settings held in the extension personal setting holding unit 310 are not targeted for synchronization with the external device 104. There are cases where the extension program 303 includes applications developed by a third party other than the company that operates the image forming apparatus. In this case, it is difficult to control the content of the personal settings handled by the extension program 303 and there is a concern about the data size and security, and thus the personal settings held in the extension personal setting holding unit 310 are not synchronized.

On the other hand, an embedded program 305 is a control program for a printer, a facsimile, a scanner, and the like that is originally provided. The embedded program 305 includes the following programs and database.

A personal setting management unit 307 is a program that manages the personal settings handled by the embedded program 305. By calling the API provided by the personal setting management unit 307, the embedded program 305 can perform registration of personal settings or the like. A password information management unit 309 is a program for managing password information handled by the embedded program 305. The password information of the embedded program 305 is managed as the personal setting for each user in the password information management unit 309. The password information management unit 309 is a wrapper that is created specifically for operation of password information, in particular, among the functions of the personal setting management unit 307. A personal setting holding unit 311 is a database that holds the personal settings handled by the embedded program 305. The personal settings held in the personal setting holding unit 311 are synchronized with those of the external device 104 with the flow of processing shown in FIGS. 8 and 9, which will be described later. Also, in order to control synchronization, a synchronous control flag is provided, as synchronous control information, to the personal settings held in the personal setting holding unit 311. In the present embodiment, even in the case of a configuration in which the personal settings of a login user are downloaded, the personal settings that have been downloaded once are held in the personal setting holding unit 311. In this case, the personal settings held in the server (that is, the external apparatus 104) are master data.

Figure 17:
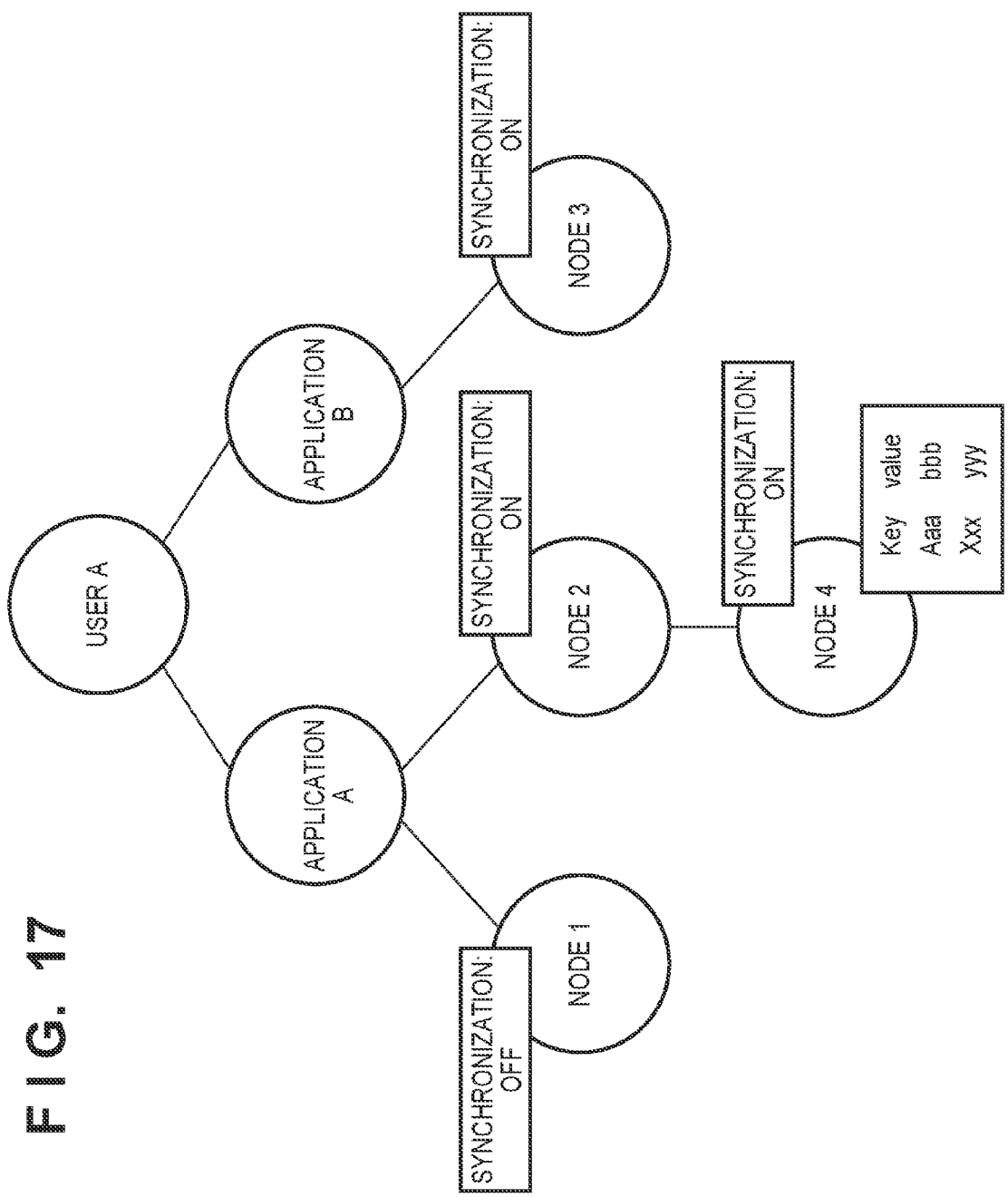
FIG. 17 shows a relationship between the data structure of personal settings and the synchronous control flag according to the embodiment.

Here, the synchronous control flag will be described. FIG. 17 is a diagram showing the relationship between a data structure of personal settings and the synchronous control flag. As shown in FIG. 17, the synchronous control flag is provided in node units. At the time of synchronization of the personal settings, which will be described later, it is possible to perform control of whether or not synchronization is performed at each node with reference to the synchronous control flag. For example, in the present embodiment, the Ver3.2 firmware does not synchronize any pieces of password information, and thus the synchronous control flag associated with all pieces of the password information are OFF. Each node indicates personal setting information that can be defined by an application. The personal settings can be designated by user identification information, application identification information, and personal setting specification information including information for specifying a node in the application. The password information management unit 309 and the password information management unit 308 are nodes indicating lower-level applications of the user nodes, and the password information is managed as the personal setting therein.

The description will now return to FIG. 3 again. A synchronization management unit 312 is a program for managing overall synchronization with the external device 104. A personal setting synchronization unit 313 is realized by the CPU 203 executing a program for synchronizing the personal settings with those of the external device 104. These programs will be described later with reference to FIGS. 4 to 7. A personal setting distribution unit 314 is realized by the CPU 203 executing a program for distributing the personal settings held in the extension personal setting holding unit 310 or the personal setting holding unit 311. This program will be described later with reference to FIGS. 8 and 9.

The scanner control unit 315 is realized by the CPU 203 executing a program for controlling the scanner 215 via the scanner I/F 210. Also, the printer control unit 316 is realized by the CPU 203 executing a program for controlling the printer 214 via the printer I/F 209. The software configuration has been described above.

Upload Processing by Personal Setting Synchronization Unit

Figure 4:
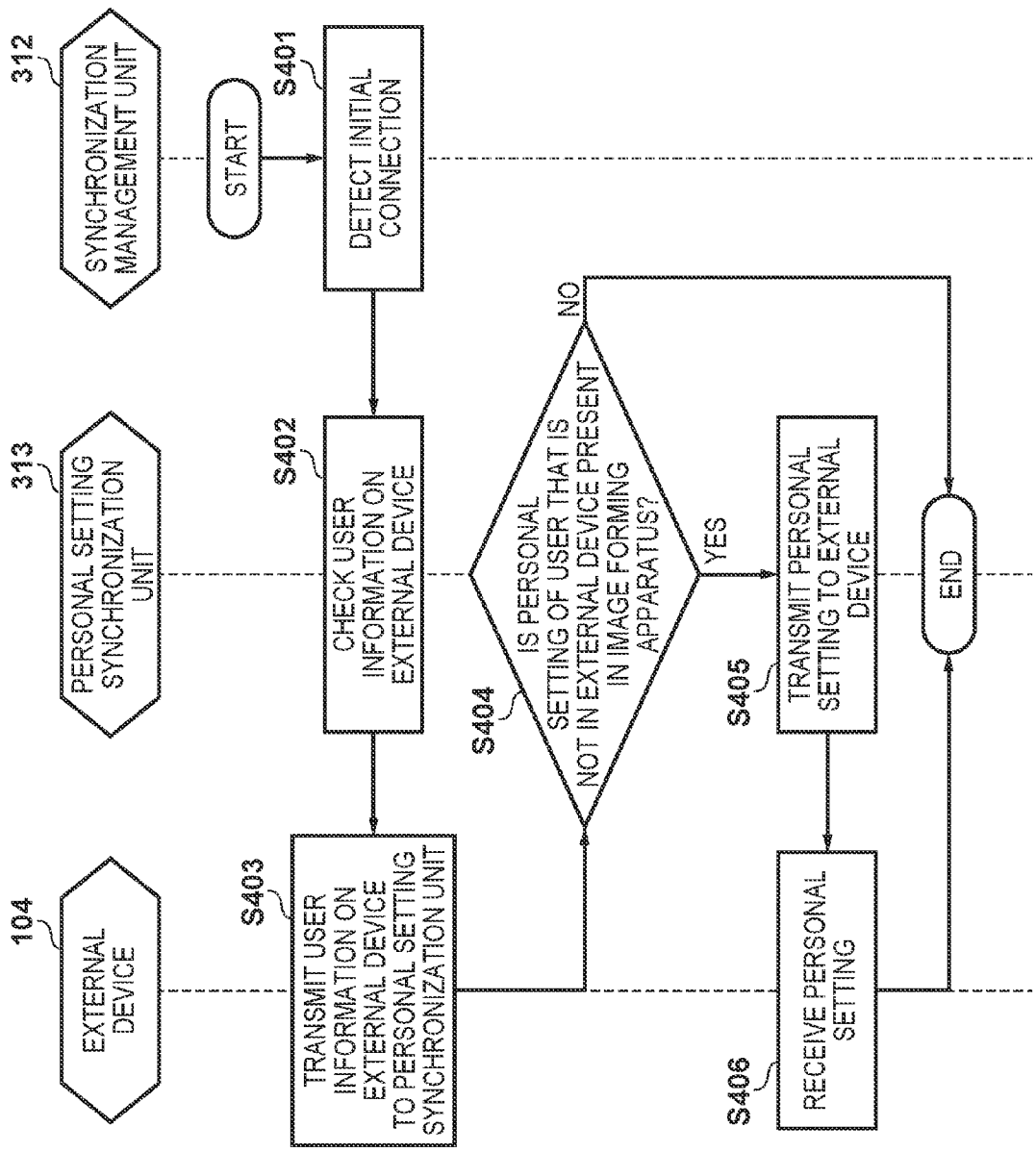
FIG. 4 is a software configuration diagram of the image forming apparatus of the embodiment.

Here, synchronization of personal settings performed by the personal setting synchronization unit 313 will be described with reference to FIGS. 4 to 7. FIG. 4 is a flowchart illustrating the flow of the case where, when the image forming apparatus 101 is connected to the external device 104 such as a server for the first time (referred to as first connection hereinafter), the personal settings held in the image forming apparatus 101 are uploaded to the external device 104. Note that it is sufficient that the first connection referred to here is a connection newly set from the state in which the connection is disconnected, and need not literally be the first time that the connection is set. In FIG. 4, the processing starts from the step of the synchronization management unit 312 detecting the first connection and ends with the step of the external device 104 receiving the personal settings.

Step S401 is a step of the synchronization management unit 312 detecting the first connection. Upon detecting the first connection, the synchronization management unit 312 starts processing so as to transmit the personal settings held in the image forming apparatus 101 to the external device 104. After the detection of the first connection, the synchronization management unit 312 makes a request to the personal setting synchronization unit 313 to acquire information of the external device 104, and the processing transitions to step S402.

Step S402 is a step of the personal setting synchronization unit 313 acquiring the information of the external device 104. The personal settings are managed collectively by the external device 104. In the case where the personal settings held in the image forming apparatus 101 already exist in the external device 104, it is not necessary to transmit the personal settings to the external device 104. In view of this, in step S402, a request for transmitting user information as the information relating to the presence or absence of the personal settings in the external device 104 is made to the external device 104. In step S403, upon receiving the request, the external device 104 transmits the user information of the external device 104 to the personal setting synchronization unit 313.

Step S403 is a step of the external device 104 transmitting user information to the personal setting synchronization unit 313 as the information relating to the presence and absence of the personal setting on the external device 104. Upon receiving the user information, the personal setting synchronization unit 313 determines in step S404 whether or not it is necessary to transmit the personal setting to the external device 104.

Step S404 is a step of the personal setting synchronization unit 313 determining whether or not it is necessary to transmit the personal setting to the external device 104. That is, in step S404, it is determined whether or not the personal information of a user that is not held in the external device 104 is present in the image forming apparatus. If the corresponding personal setting is not present in the external device 104, the processing transitions to step S405 in order to transmit the personal setting to the external device 104, and if the corresponding personal setting is present, this flowchart ends because it is not necessary to transmit the personal setting to the external device 104. Note that in step S404, the personal setting synchronization unit 313 receives the list of user identification information described in the root node for the personal settings as shown in FIG. 17, from the external device 104, for example, and collates the received information with the user identification information of the personal setting held in the personal setting holding unit 311. If the personal information of a user who is not included in the list of the received user identification information is held in the personal setting holding unit 311, it can be determined that the corresponding personal setting is present.

Step S405 is a step of the personal setting synchronization unit 313 transmitting a personal setting that is not held in the external device 104 to the external device 104. After transmission, the external device 104 holds the received personal setting in the next step S406.

Step S406 is a step of the external device 104 receiving the personal setting from the personal setting synchronization unit 313. The external device 104 holds the personal settings received from the personal setting synchronization unit 313 as the master information of the user, and this flowchart ends.

As described above, in the case where the image forming apparatus 101 is firstly connected to the external device 104, the processing for transmitting a personal setting that is not present on the external device 104 to the external device 104 is performed.

Figure 5:
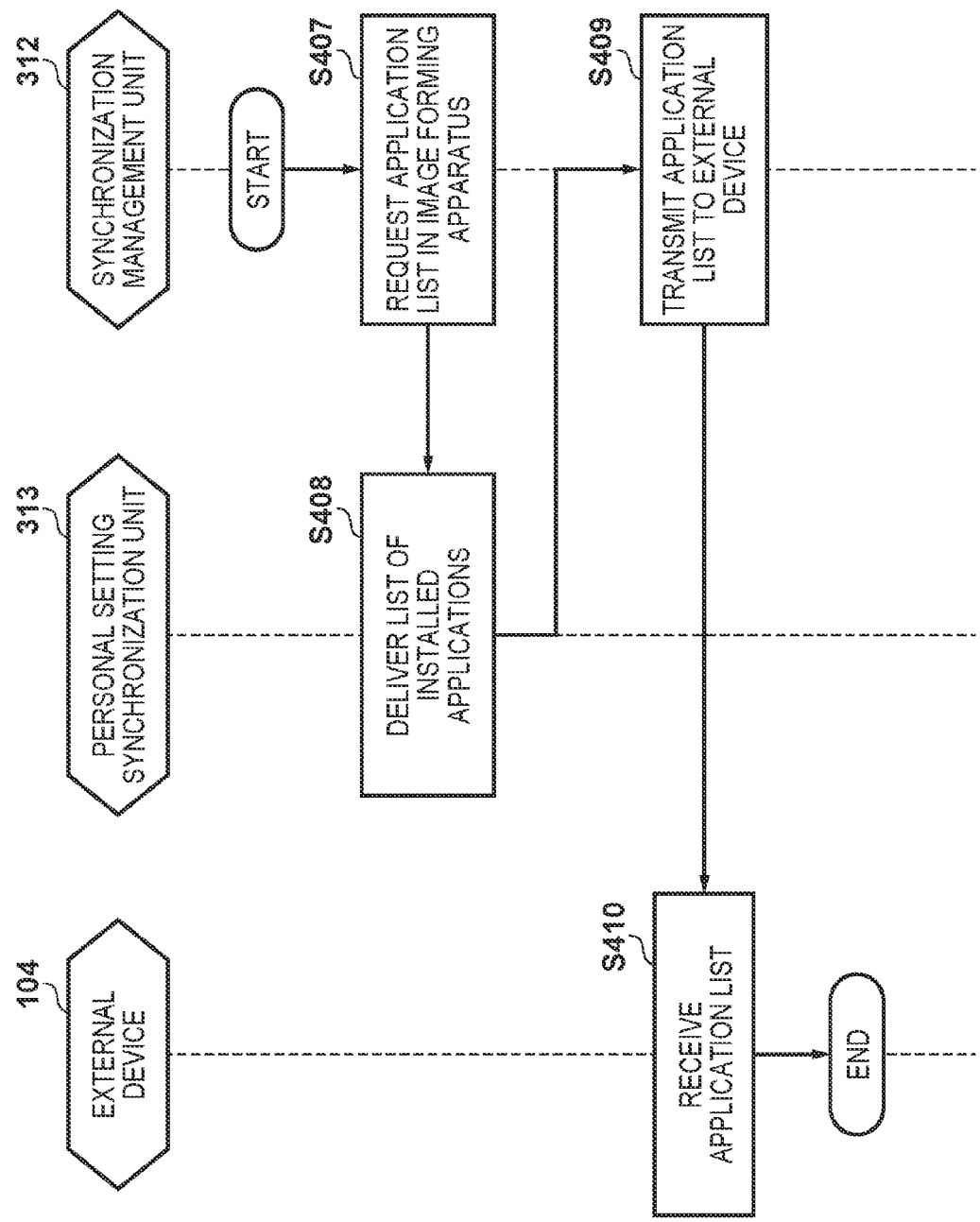
FIG. 5 is a software configuration diagram of the image forming apparatus of the embodiment.

Synchronization Processing Performed by Personal Setting Synchronization Unit at Time of Activation Next, synchronization processing at the time of activation of the image forming apparatus 101 will be described with reference to FIG. 5. FIG. 5 is a flowchart illustrating the flow for transmitting a list of applications installed in the image forming apparatus 101 to the external device 104 at the time of activation of the image forming apparatus 101. In the case where a plurality of image forming apparatuses are connected to one external device 104, there are cases where applications installed in the image forming apparatuses are different from each other. In view of this, transmitting the list of installed applications to the external device 104 at the time of the activation of the image forming apparatus 101 prevents the personal settings relating to applications that are not installed, that is, prevents unnecessary applications from being downloaded. In FIG. 5, the processing starts from the step of the synchronization management unit 312 making a request to the personal setting synchronization unit 313 to acquire the application list, and ends with the step of the external device 104 acquiring the application list.

Step S407 is the step of the synchronization management unit 312 making a request to the personal setting synchronization unit 313 to deliver the application list. Upon receiving the request, the personal setting synchronization unit 313 delivers the application list to the synchronization management unit 312 in step S408, which will be described later.

Here, the application list will be described. FIG. 18 is an example of the application list. Application information including names and IDs of applications installed in the image forming apparatus 101 and the states and types of the applications is written in the application list. The states of applications include states such as being installed, started, starting, and the like, for example. The types of application include identification information such as login service and system service. The IDs of applications are identification information for specifically identifying applications in at least a server (external apparatus 104). The application list is a list of embedded programs and extension programs, and programs belonging to the embedded program 305 and the extension program system service 304 may be registered in advance. With regard to the extension program 303, application information of the extension program is newly registered in response to installation. In the case where an application is uninstalled, the application information of the application may be deleted from the application list, or the state may be rewritten as "uninstalled", for example. Also, applications that are invalidated due to the license having expired, for example, may be deleted from the application list, or an invalidation state such as "invalidated" or "expired" may be displayed in a state field. In the case where the uninstallation or invalidation state is displayed in the state field, an apparatus and the like that referred to the application list determines that the application is not installed in the corresponding image forming apparatus or is in an invalidated state, and the apparatus and the like perform processing in accordance with the determination.

The description will now return to FIG. 5 again. Step S408 is the step of the personal setting synchronization unit 313 distributing the application list to the synchronization management unit 312. Upon receiving the application list, the synchronization management unit 312 transmits the list to the external device 104 in step S409, which will be described later.

Step S409 is the step of the synchronization management unit 312 transmitting the application list to the external device 104. At this time, the identification information for identifying the image forming apparatus, which is a transmission source, is also transmitted. In the next step S410, the external device 104 receives the application list and the identification information of the image forming apparatus, which is the transmission source, and uses the received information in the synchronization processing.

Step S410 is the step of the external device 104 receiving the application list from the synchronization management unit 312. The external device 104 decides the personal settings to be synchronized with reference to the list. The processing for receiving and distributing the list is completed in step S410, and the flowchart ends.

The image forming apparatus 101 sends the list of installed applications to the external device 104 at the time of activation. The external device 104 determines whether a personal setting is to be synchronized with reference to the list. That is, the external apparatus 104 can specify the installed applications for each image forming apparatus with the application list.

Figure 6:
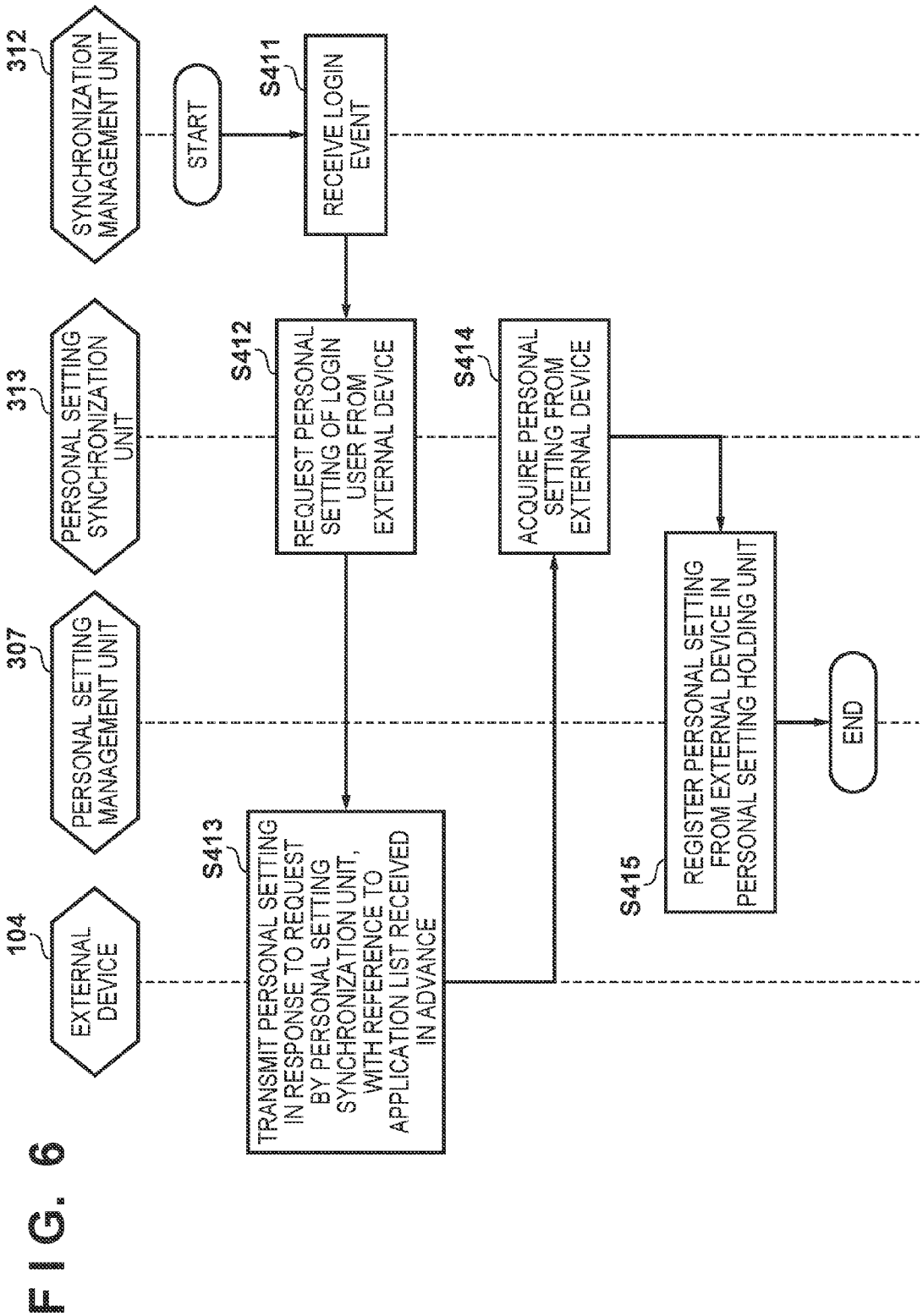
FIG. 6 is a software configuration diagram of the image forming apparatus of the embodiment.

Download Processing Performed by Personal Setting Synchronization Unit at the Time of Log-In Next, the processing for downloading the personal settings of a user from the external device 104 in the case where the user logs in to the image forming apparatus 101 will be described with reference to FIG. 6. In FIG. 6, the processing starts from the step of the synchronization management unit 312 receiving a login event and is completed with the step of the personal setting management unit 307 registering personal settings.

Step S411 is a step of the synchronization management unit 312 detecting user login. Triggered by the user login, the processing transitions to step S412 in order for the synchronization management unit 312 to make a request to the external device 104 to acquire the personal settings via the personal setting synchronization unit 313.

Step S412 is the step of the personal setting synchronization unit 313 making a request to the external device 104 to receive the personal settings. However, as shown in FIG. 17, synchronous control flags are associated with the personal settings for each user and each application (program). Furthermore, synchronous control flags (also referred to as synchronous control information) can also be associated with personal setting units (arbitrary depending on the application) managed by an application, depending on the applications. In view of this, the personal setting synchronization unit 313 refers to the personal settings (shown in FIG. 17) of the user and makes a request to the external device 104 to receive the personal settings of a node in which a synchronous control flag is set to on, by designating the personal settings of the node using personal setting specification information. The user herein may be limited to a login user. Upon receiving the request, the external device 104 transmits the designated personal settings in the next step S413.

Step S413 is the step of the external device 104 transmitting the personal setting to the personal setting synchronization unit 313 in response to the reception of the request. The external device 104 transmits a necessary personal setting to the personal setting synchronization unit 313 based on the application list received from the image forming apparatus 101 in FIG. 5 described above. The necessary personal settings here refers to personal settings that have been requested. Thereafter, the processing transitions to step S414.

Step S414 is the step of the personal setting synchronization unit 313 receiving the personal settings from the external device 104. After the reception, the received personal setting is registered in the personal setting holding unit 311 in the next step S415. That is, the personal setting holding unit 311 is updated with the received personal setting. Step S415 is the step of the personal setting management unit 307 registering the personal setting in the personal setting holding unit 311. The processing for downloading the personal settings from the external device 104 is completed in this step S415, and this flowchart ends. When an application is activated, the personal settings of a login user for the application are read out, and loaded to a predetermined storage area, as a result of which the personal settings are reflected.

As described above, if a user logs in to the image forming apparatus 101, the personal setting of the user can be acquired from the external device 104 and the personal setting can be reflected on the image forming apparatus 101. Note that although a request for acquiring the personal setting of the node, among the personal settings of a login user, in which an update control flag is set to on is made in the above-described procedures, a configuration is possible in which the image forming apparatus specifies only the user and makes a request for the personal settings, and the external device 104 references to the update control flags of the nodes of the personal settings so as to transmit the personal setting of a node that is set to on to the image forming apparatus.

Figure 7:
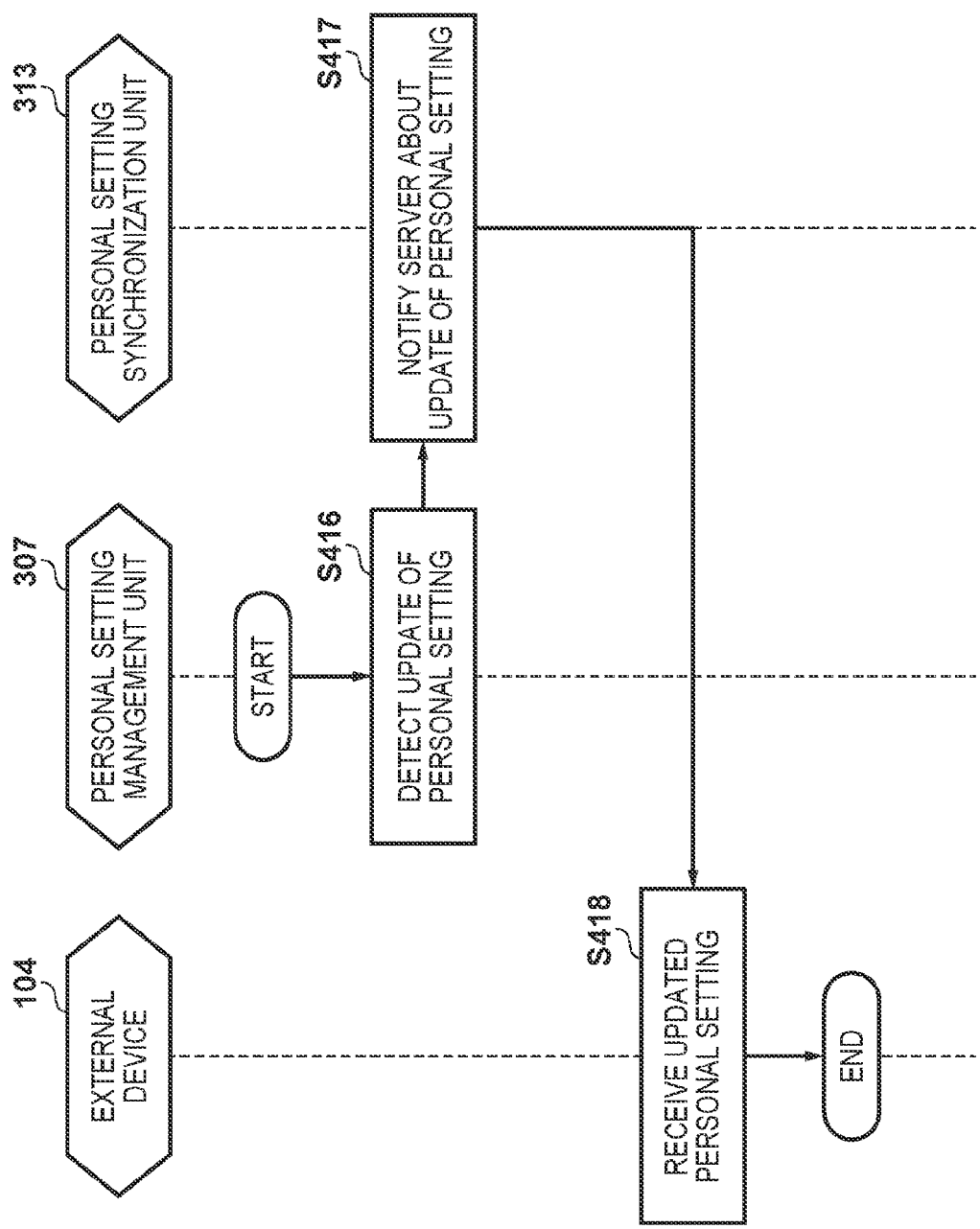
FIG. 7 is a flowchart when personal settings of the image forming apparatus of the embodiment and personal settings of an external device are synchronized.

Processing for Synchronizing Personal Settings Performed by Personal Setting Synchronization Unit Next, processing for reflecting updated personal settings on the external device 104 when a personal setting is updated on the image forming apparatus 101 will be described with reference to FIG. 7. In FIG. 7, the processing starts from the step of the personal setting management unit 307 detecting a change in personal settings, and ends with the step of the external device 104 receiving the updated personal settings.

Step S416 is the step of the personal setting management unit 307 detecting a change in the personal settings. The personal setting management unit 307 makes a request to the personal setting synchronization unit 313 to upload the personal settings, triggered by the change in the personal settings. Note that the personal settings, which are the updating target, are personal settings of a node in which a synchronous control flag is set to on, and the node in which the synchronous control flag is off is not the target. In view of this, the synchronous control flag associated with the changed personal setting is first referred to, and if the synchronous control flag is on, an upload request is made. Upon receiving the request, the personal setting synchronization unit 313 transmits the personal setting to the external device 104 in the next step S417. The personal setting here can be changed by a login user changing the settings of an application and making the change permanent, for example, that is, by reflecting the change in the settings on the personal setting holding unit 311. In this case, the change in the personal setting, which is detected in step S416 and triggers the processing, can be detected by the personal setting held in the personal setting holding unit 311 being updated. In this case, synchronization of the personal settings is performed each time the setting is changed in accordance with the settings of the synchronous control flag. Alternatively, the detection of change in the personal setting in step S416 may be performed using the personal settings of a user being updated as a trigger for the processing when the user logs out, instead of being performed each time the setting is changed as described above. In this case, if the personal setting whose synchronous control flag is set to on is changed when the user logs out, the personal setting is synchronized.

Step S417 is the step of the personal setting synchronization unit 313 transmitting the personal setting updated in the image forming apparatus 101 to the external device 104. After the transmission of the personal setting, the external device 104 registers the received personal setting in the next step S418.

Step S418 is the step of the external device 104 updating the corresponding personal setting that is registered in a DB (not shown) on the external device 104 with the personal setting received from the personal setting synchronization unit 313. The corresponding personal setting can be specified with the identification information of a user and the identification information of an application, for example. The processing for uploading the personal setting changed on the image forming apparatus 101 to the external device and the processing for updating the external device 104 are completed in this step S418, and this flowchart ends.

As described above, if a personal setting is updated on the image forming apparatus 101, the updated personal setting can be uploaded to the external device 104. That is, the personal setting held in the external device 104 can be synchronized with the personal setting of the image forming apparatus 101. Note that testing the synchronous control flag may be performed by the personal setting synchronization unit 313 instead of the personal setting management unit 307.

Export Processing by Personal Setting Distribution Unit

Here, distribution of personal settings will be described with reference to FIGS. 8 and 9. Password information will be described using personal setting information as an example in the following example. The password information is personal setting information of the extension password information management unit 308, for example. Procedures described here are for distributing a synchronous control flag associated with personal setting information, together with specific personal setting information (password information in this example).

Figure 8:
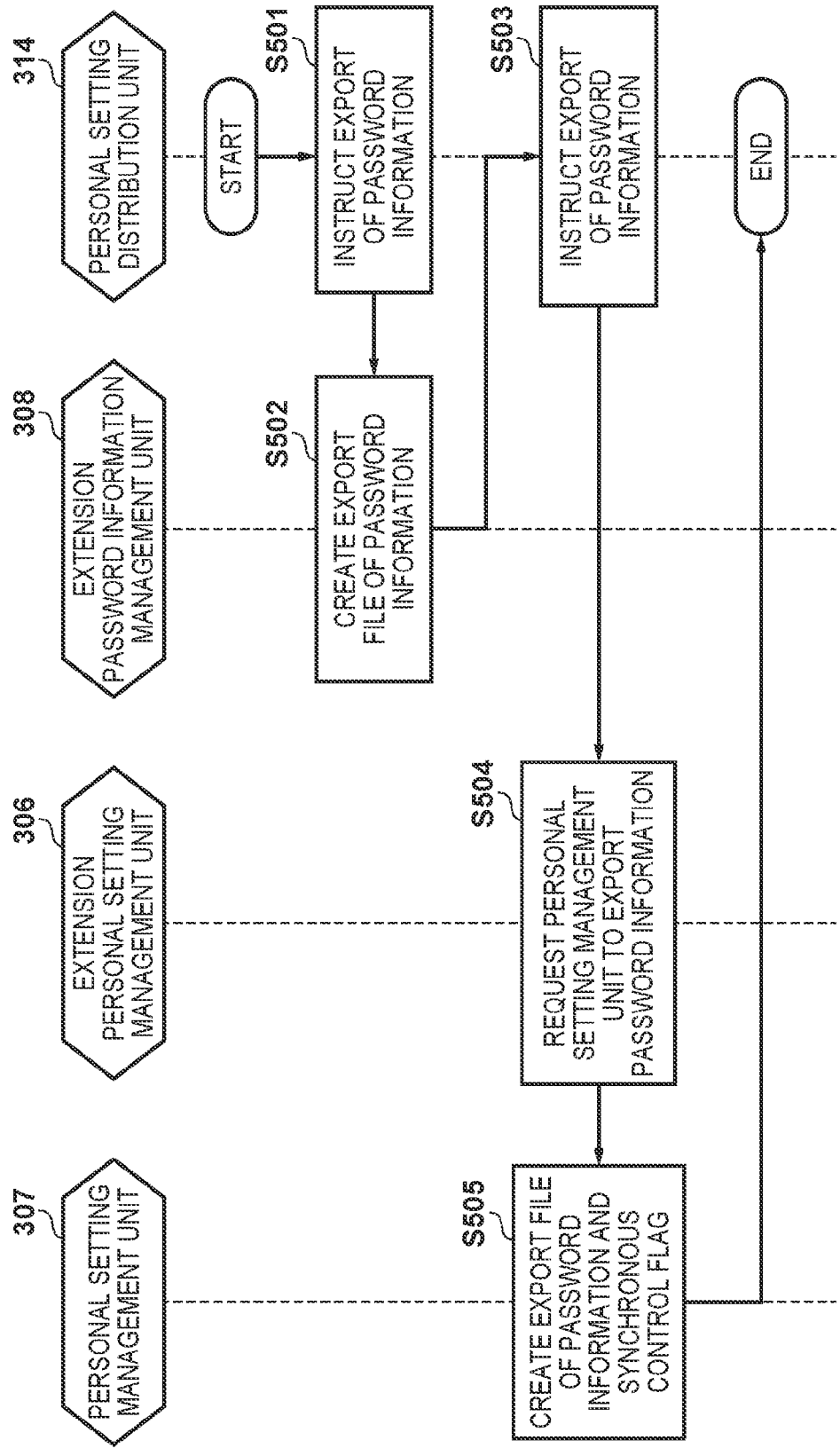
FIG. 8 is a flowchart when personal settings of the image forming apparatus of the embodiment and personal settings of an external device are synchronized.
Figure 9:
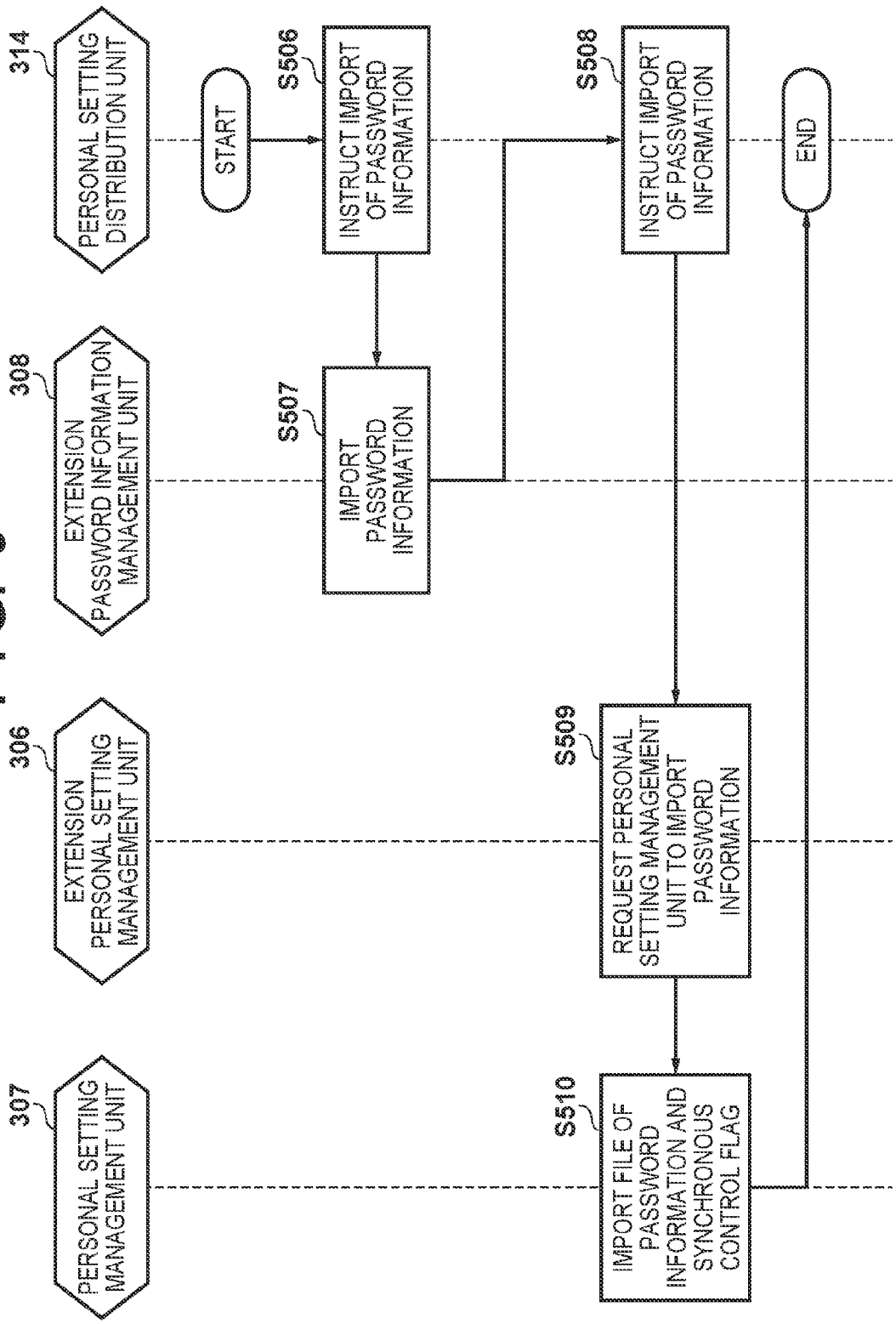
FIG. 9 is a flowchart when personal settings of the image forming apparatus of the embodiment are distributed.

FIG. 8 is a flowchart illustrating the flow for exporting a personal setting from the image forming apparatus 101. The processing for distributing password information (including importing and exporting) is performed in accordance with an operation of the user in the image forming apparatus 101, for example. An exporting target is limited in accordance with the authority of the user who instructs the export, or the like. If the user is an ordinary user, for example, only password information relating to the user is the distribution target, and if the user is the administrator, all users may be the distribution targets. In FIG. 8, the processing starts from the step of the personal setting distribution unit 314 giving an instruction for exporting the password information, and ends with the step of the personal setting management unit 307 creating files for exporting the password information and a synchronous control flag.

Step S501 is the step of the personal setting distribution unit 314 giving an instruction to the extension password information management unit 308 to export the password information. Pieces of the password information are broadly classified into information handled by the extension program 303 and information handled by the embedded program 305. First, the personal setting distribution unit 314 gives an instruction for exporting the password information handled by the extension program 303 in this step S501, and then gives an instruction for exporting the password information handled by the embedded program 305 in step S503 described later. However, there is no particular limitation on this order, and thus even if password information handled by the embedded program 305 is first exported, no problem arises. Upon receiving the instruction from the personal setting distribution unit 314, the extension password information management unit 308 performs the actual export processing in the next step S502.

Step S502 is the step of the extension password information management unit 308 exporting the password information. After an export file including the password information of the extension program 303 is created and exported, the processing transitions to step S503.

Step S503 is the step of the personal setting distribution unit 314 giving an instruction to the extension personal setting management unit 306 to export the password information. Upon receiving the instruction from the personal setting distribution unit 314, the extension personal setting management unit 306 performs the actual export processing from the next step S504 onward.

Step S504 is the step of the extension personal setting management unit 306 requesting the personal setting management unit 307 to export the password information handled by the embedded program 305. The extension personal setting management unit 306 gives an instruction for exporting to the personal setting management unit 307, and the processing transitions to step S505.

Step S505 is the step of the personal setting management unit 307 exporting the password information and the synchronous control flag. The personal setting management unit 307 creates a file including the password information held in the personal setting holding unit 311 and the synchronous control flag, and exports the resulting file. In order to specify the node of the corresponding personal setting information (password information in this example), the synchronous control flag is exported in association with the personal setting specification information, for example. Similar synchronous control can be reproduced in the import destination by exporting the synchronous control flag together with the password information. The export processing is completed in step S505, and the flowchart ends. The synchronous control flag is set for each user and each application, as depicted in FIG. 17. Furthermore, the exported password information (and synchronous control flag) is imported by other image forming apparatuses or the like in the application as well.

Import Processing by Personal Setting Distribution Unit

Next, processing performed when password information is imported will be described with reference to FIG. 9. In FIG. 9, the processing starts from the step of the personal setting distribution unit 314 giving an instruction for importing password information, and ends with the step of the personal setting management unit 307 importing the password information and the synchronous control flag.

Step S506 is the step of the personal setting distribution unit 314 giving an instruction to the extension password information management unit 308 to import password information for an extension program. Upon receiving the instruction, the extension password information management unit 308 imports the password information in the next step S507.

Step S507 is the step of the extension password information management unit 308 importing the password information handled by the extension program 303. For example, the extension password information management unit 308 reads the password information for an extension program from a designated import file, and stores the read password information for an extension program in a predetermined location. When importing ends, processing for importing the embedded program 305 is then performed in the next step S508.

Step S508 is the step of the personal setting distribution unit 314 giving an instruction to the extension personal setting management unit 306 to import a password for an embedded program. Upon receiving the instruction, the extension personal setting management unit 306 gives an instruction to the personal setting management unit 307 to perform actual import processing in step S509.

Step S509 is the step of the extension personal setting management unit 306 requesting import. The extension personal setting management unit 306 gives an instruction to the personal setting management unit 307 to import the password information. Upon receiving the instruction, the personal setting management unit 307 performs processing for importing the password information for an embedded program in the next step S510.

Step S510 is the step of the personal setting management unit 307 importing the password information for an embedded program and a synchronous control flag. Importing the synchronous control flag enables synchronous control of password information in the distribution source to be reproduced. Associating the synchronous control flag with the personal setting specification information (password information here), for example, makes it possible to specify the corresponding node. When being imported, the synchronous control flag is stored as the synchronous control flag of a node of the specified personal setting. The import processing is completed in this step S510, and the flowchart ends.

Note that although the above-described example has been described assuming that password information is exported and imported as specific personal information, the specific personal information is not limited to passwords.

As described above, the personal setting handled by the extension program 303 and the personal setting handled by the embedded program 305 are targets for importing and exporting the personal setting. Also, since the personal setting handled by the embedded program 305 is a target for synchronization, the synchronous control flag is added thereto. At the time of importing and exporting, synchronous control of the distribution source can be reproduced in the distribution destination by also distributing the synchronous control flag.

Second Embodiment

In the first embodiment, the version of the image forming apparatus was not particularly taken into consideration, and the control flag for updating the personal setting held in the image forming apparatus, which is the export source, is applied to an image forming apparatus, which is the import destination. In this embodiment, a case will be described where a personal setting is distributed from a Ver3.2 image forming apparatus that does not synchronize the personal setting to a Ver3.3 image forming apparatus that synchronizes the personal setting in accordance with the version of an image forming apparatus. Note that description of the configurations and processing procedures that are shared with the first embodiment is omitted, and description will be given, focusing on export processing and import processing, which are different from those of the first embodiment.

Figure 10:
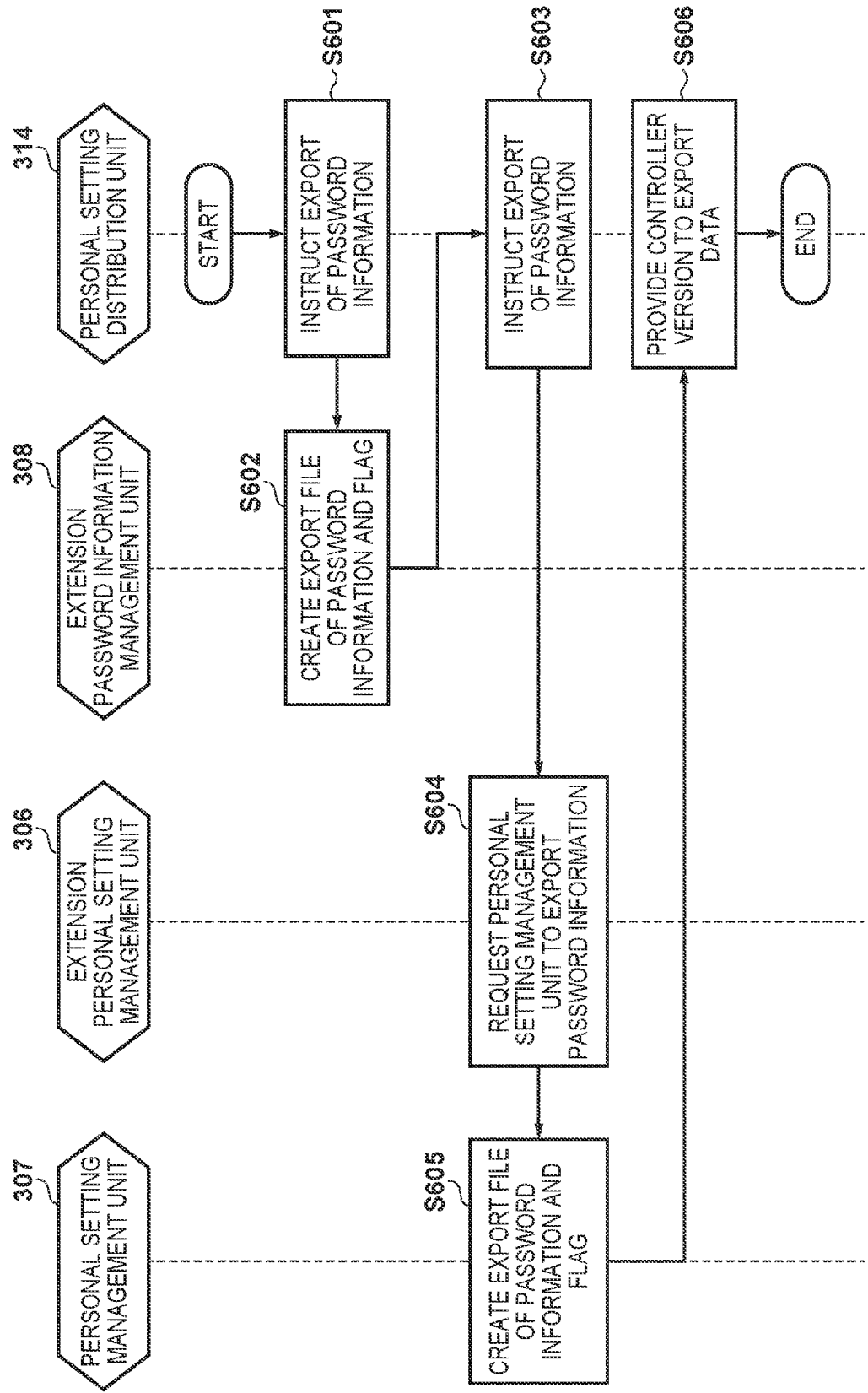
FIG. 10 is a flowchart when personal settings of the image forming apparatus of the embodiment are distributed.
Figure 11:
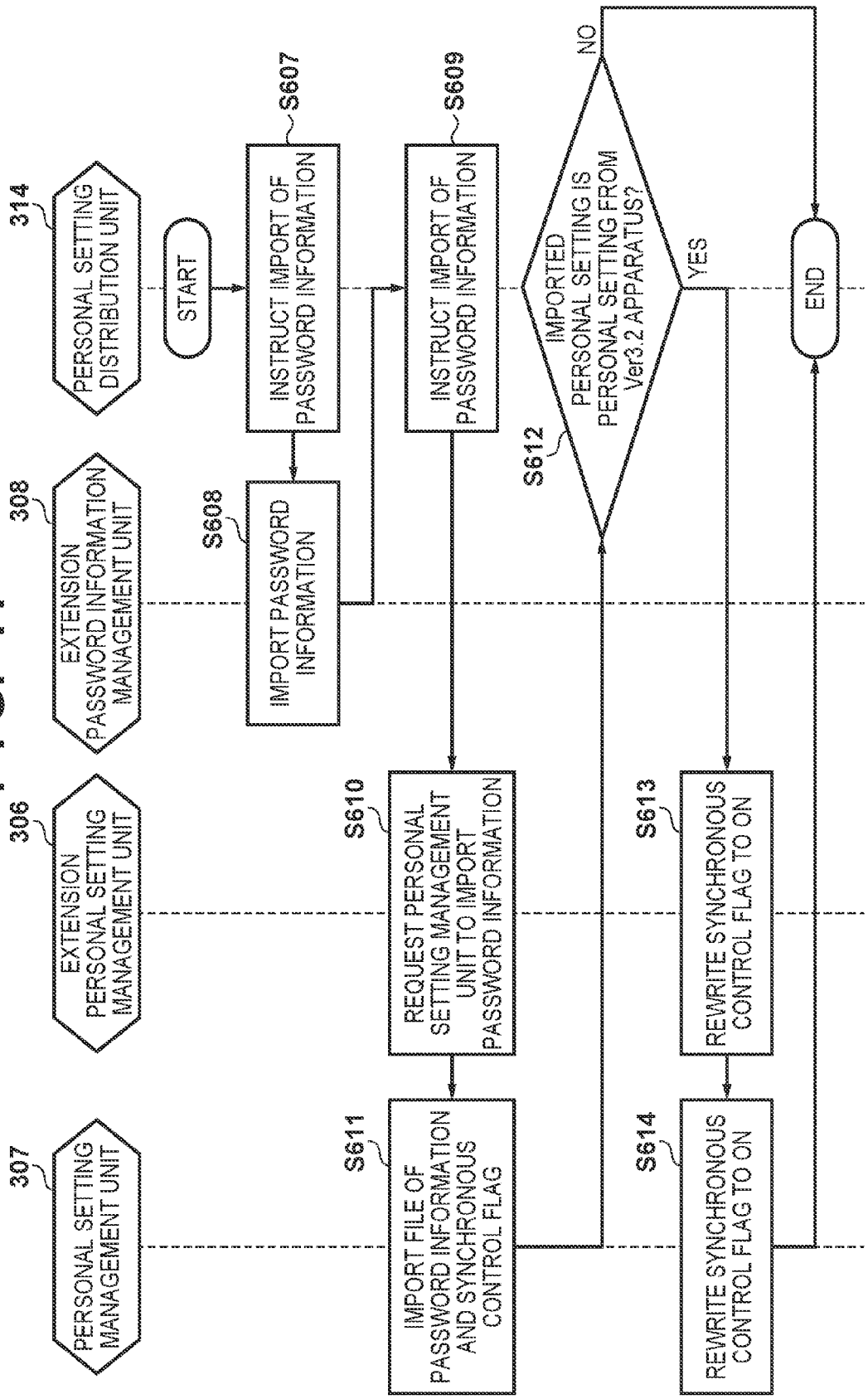
FIG. 11 is a flowchart when a synchronous control flag is rewritten in accordance with the version of firmware at the time of distribution in a first embodiment 1.

Processing for Exporting Personal Setting Between Different Versions of Image Forming Apparatuses FIGS. 10 and 11 are flowcharts illustrating the flow of processing in the case where a personal setting is distributed from a Ver3.2 image forming apparatus to a Ver3.3 image forming apparatus in the present embodiment. FIG. 10 is a flowchart when password information is exported, and FIG. 11 is a flowchart when password information is imported. First, FIG. 10 will be described. In FIG. 10, the processing starts from the step of the personal setting distribution unit 314 giving an instruction to export the password information, and ends with the step of the personal setting distribution unit 314 providing export data with the version information of firmware. Because step S601 to step S605 are similar to step S501 to step S505 shown in FIG. 8 described above, description thereof is omitted. However, unlike steps S502 and S505 of FIG. 8, a file is created but not exported (transmitted or written) in steps S602 and S605.

Step S606 is the step of the personal setting distribution unit 314 providing the version information of firmware to the created export file and exporting the resulting file. The version information is utilized to specify the version of firmware of the image forming apparatus 101, which is the distribution source, in the flowchart of FIG. 11, which will be described later. Although the version information provided at this time is information indicating the version 3.2 (Ver3.2) in this example, there is no particular limitation on the content of the version information as long as the version of firmware of the distribution source can be specified. For example, in the case where the version information cannot be provided due to the image forming apparatus being an old model, providing no information can serve as a sign for specifying the version of firmware. The export processing is completed in step S606, and this flowchart ends.

Processing for Importing Personal Setting Between Different Versions of Image Forming Apparatuses Next, the flow when the personal setting is imported will be described with reference to FIG. 11. In FIG. 11, the processing starts from the step of the personal setting distribution unit 314 giving an instruction to import password information, and ends with the step of the personal setting management unit 307 rewriting a synchronous control flag. Because step S607 to step S611 are similar to step S506 to step S510 of FIG. 9 described above, description thereof is omitted.

Step S612 is the step of the personal setting distribution unit 314 referring to the firmware version provided to the imported personal setting, and determining whether the firmware version is Ver3.2. As a premise of the present embodiment, synchronization of any pieces of password information is prohibited in the Ver3.2 (synchronous control flag is off), and synchronization of all pieces of password information is permitted in the Ver3.3 (synchronous control flag is on). Accordingly, it is necessary to rewrite the synchronous control flag of all pieces of password information that have been distributed from the Ver3.2 apparatus, at the time of importing. Therefore, the firmware version provided to the imported personal setting is determined in this step S612. Note that the expressions Ver3.2 and Ver3.3 are naturally merely examples in the present embodiment, and the versions are not limited thereto. In the case where the firmware version provided to the imported personal setting is Ver3.2, the processing transitions to step S613, whereas in the case where the firmware version is not Ver3.2, this flowchart ends. It is assumed here that the version is Ver3.2 or Ver3.3, and in the case of distributing from an apparatus with the same version (Ver3.3), it is not particularly necessary to operate the synchronous control flag.

Step S613 is the step of the extension personal setting management unit 306 making a request to the personal setting management unit 307 to rewrite the synchronous control flag. Upon receiving the request, the personal setting management unit 307 rewrites the synchronous control flag in the next step S614.

Step S614 is the step of the personal setting management unit 307 rewriting the corresponding synchronous control flag to on. The corresponding synchronous control flag is the synchronous control flag of the password information of all applications that are installed, for example. Rewriting the synchronous control flag makes it possible to synchronize the personal setting distributed from the Ver3.2 apparatus. The import processing is completed in step S614, and this flowchart ends.

As described above, in the case where the personal setting is distributed among a plurality of image forming apparatuses that have different firmware versions and differ in synchronous control, rewriting the synchronous control flag with consideration for the firmware version of the distribution source makes it possible to appropriately change the synchronous control. Specifically, even in the case where the apparatus that is the distribution source is installed with a version of firmware that does not synchronize personal settings, if the apparatus that is a distribution destination performs synchronization, the version of the apparatus that is the distribution destination into which the personal settings are imported has priority. In other words, the policy relating to synchronization in the distribution destination has priority.

Third Embodiment

This embodiment is an embodiment in the case where firmware is updated in one image forming apparatus 101 and synchronous control for the personal setting is changed as appropriate in accordance with the update. Similarly to the first embodiment, the relationship between the firmware version and whether or not synchronization is performed is assumed as follows.
Ver3.2: do not synchronize
Ver3.3: synchronize In the present embodiment, the case where firmware is updated from Ver3.2 to Ver3.3 under the above-described assumption is assumed. Because the system configuration, hardware configuration, and software configuration of the present embodiment are similar to those in the first embodiment, description thereof is omitted.

Figure 12:
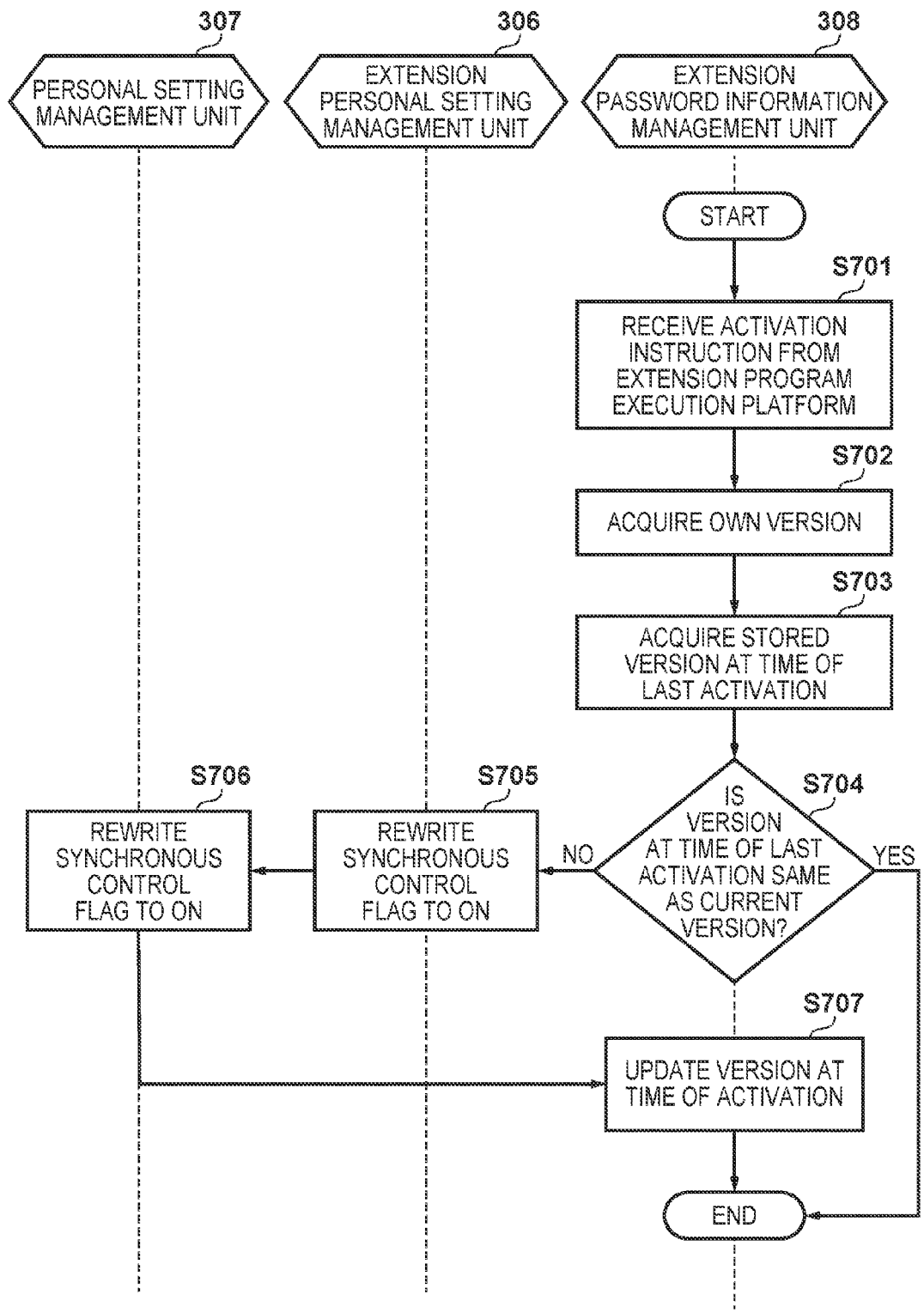
FIG. 12 is a flowchart when a synchronous control flag is rewritten in accordance with the version of firmware when the firmware is updated in a second embodiment.

FIG. 12 is a flowchart illustrating the flow in the case where when the image forming apparatus 101 is activated, the extension password information management unit 308 compares the current version of firmware to the version of firmware recorded when last activated, and if the firmware has been updated, the setting is switched from the setting in which the firmware version is not synchronized to the setting in which the firmware version is synchronized. In FIG. 12, the processing starts from the step of the extension password information management unit 308 receiving an activation instruction from the extension program execution platform 302, and ends with the step of the extension password information management unit 308 updating the version information at the time of activation.

Step S701 is the step of the extension password information management unit 308 receiving an activation instruction from the extension program execution platform 302. Upon receiving the activation instruction, the extension password information management unit 308 starts activation processing, and checks the version in the next step S702.

Step S702 is the step of the extension password information management unit 308 checking its own version. In order to compare the current version and the version at the time of the last activation in step S704, which will be described later, the version of the extension password information management unit itself is checked in this step S702. Note that regarding the version to be checked, updating of firmware need only to be detected. Therefore, the version that is detected may be the version of the overall controller firm instead of the version of the extension password information management unit 308 itself, but is not limited to this. Thereafter, the processing transitions to step S703.

Step S703 is the step of the extension password information management unit 308 acquiring the version at the time of the last activation. In order to compare the current version and the version at the time of the last activation in step S704, which will be described later, the version at the time of the last activation is referred to in this step S703. The version information at the time of the last activation is stored in a non-volatile rewritable storage location from which the information is not deleted by updating firmware or the like. Note that there is no particular limitation on the content of the version information to be stored at this time as long as the version of firmware can be specified. For example, the fact that the version information at the time of the last activation is not stored in a predetermined location due to the apparatus being an old model or the like may be utilized to specify the firmware version. Thereafter, the processing transitions to step S704.

Step S704 is the step of the extension password information management unit 308 comparing the version at the time of the last activation and the current version. In the case where the versions are different from each other, the processing transitions to step S705, whereas in the case where the version has not changed, this flowchart ends.

Step S705 is the step of the extension personal setting management unit 306 rewriting the synchronous control flag. In the case where updating of the version has been detected in step S704 described above, in order to change synchronous control in accordance with the firmware version, the synchronous control flag is rewritten. A request for rewriting the flag is made to the personal setting management unit 307, and the processing transitions to step S706.

Step S706 is the step of the personal setting management unit 307 rewriting the synchronous control flag. After the flag has been rewritten, the processing transitions to step S707. Rewriting the synchronous control flag in steps S705 and S706 may be performed in accordance with the current firmware version. In this case, if the firmware has been updated and the updated version is a predetermined version, for example, version 3.3, the synchronous control flags included in the personal setting are all set to on. On the other hand, even if the firmware has been updated, if the current version is 3.2, the synchronous control flags are all set to off.

Step S707 is the step of the extension password information management unit 308 storing the updated firmware version. The version stored in this manner is referred to at the time of the next activation or in step S703, and is used in comparison in step S704. The synchronous control flag rewriting at the time of activation is completed in step S707, and this flowchart ends.

As described above, even if the firmware is updated, rewriting the synchronous control flag in accordance with the update enables synchronous control to be changed as appropriate. Although the synchronous control flag is set to on in accordance with the version of firmware in the present embodiment, the synchronous control flag may be set to off in accordance with the version. For example, if the version before updating is Ver3.3 and is changed to Ver3.2 by updating, all of the synchronous control flags may be set to off.

Fourth Embodiment

This embodiment is an embodiment in the case where when synchronous control is switched due to a difference in the version of firmware, the external device 104 is utilized instead of the method using the synchronous control flag described in Embodiments 1 to 3. For example, in the case where an image forming apparatus cannot be changed greatly due to the apparatus being an old model or the like, this embodiment can address the switching at low cost. In the present embodiment as well, the relationship between the firmware version and whether synchronization is performed is defined as follows.

Ver3.2: do not synchronize
Ver3.3: synchronize

Because the system configuration, hardware configuration, and software configuration of the present embodiment are similar to those in the first embodiment, description thereof is omitted.

Figure 13:
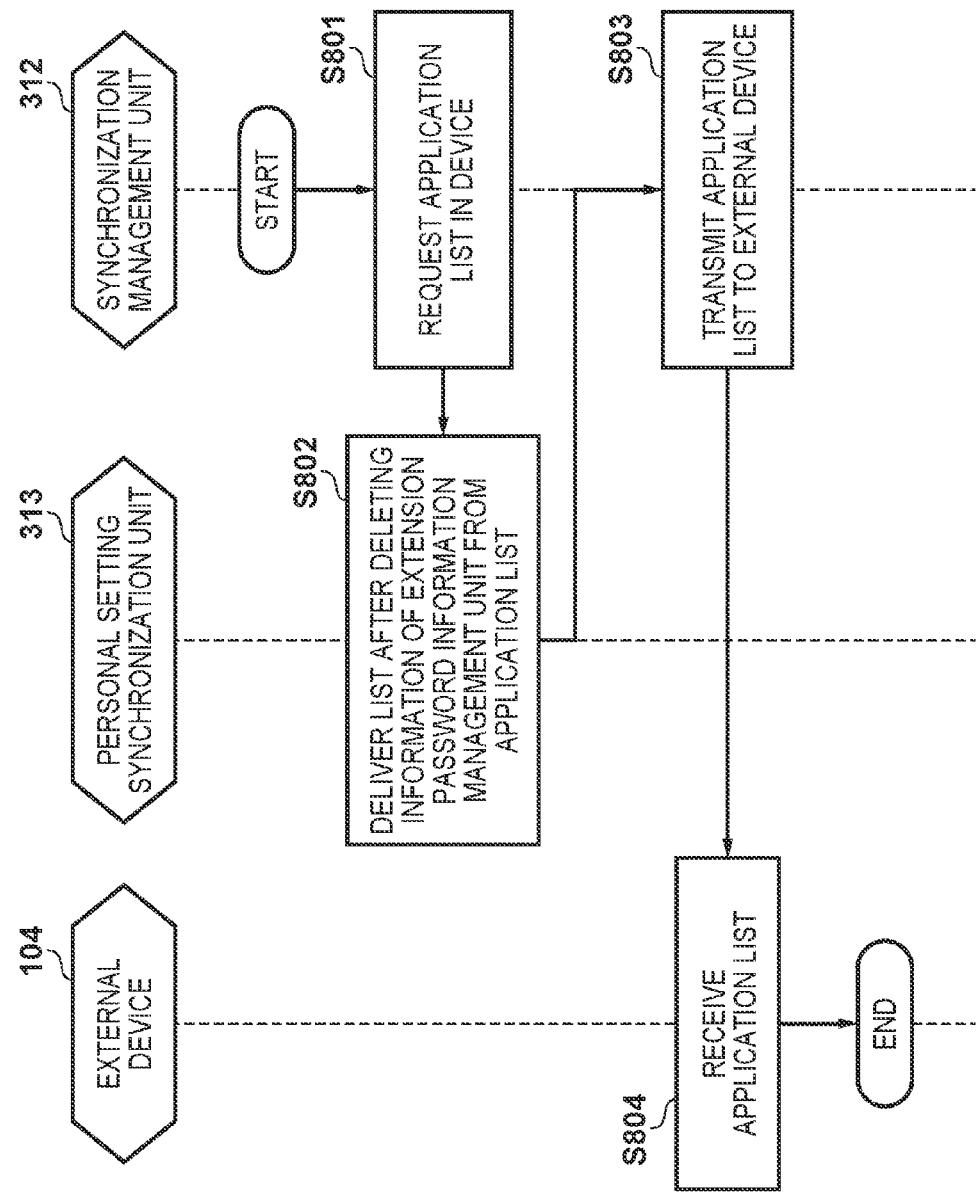
FIG. 13 is a flowchart when information of an extension password information management unit is deleted from an application list in a third embodiment.

FIG. 13 is a flowchart illustrating the flow in the case where when an application list is sent to the external device 104 when the image forming apparatus 101 is activated, information of the extension password information management unit 308 is deleted from the list. As described above, when the external device 104 synchronizes the personal setting with that of the image forming apparatus 101, the external device 104 acquires the application list in the image forming apparatus 101 in advance and performs synchronization of the personal setting based on the acquired list. As a result of deleting the information of the extension password information management unit 308 from the list, the external device 104 determines that the extension password information management unit 308 is not present in the image forming apparatus 101, and does not synchronize the password information, which is an example of the personal setting information. Accordingly, it is possible to not perform or to prohibit the synchronization of the password information without operating the synchronous control flag of the password information. In FIG. 13, the processing starts from the step of the synchronization management unit 312 making a request to receive the application list in the image forming apparatus 101, and ends with the step of the external device 104 acquiring the application list. Because step S801 is similar to step S407 of FIG. 5, description thereof is omitted.

Step S802 is the step of the personal setting synchronization unit 313 deleting the information of the extension password information management unit 308 from the application list. As described above, as a result of deleting the information of the extension password information management unit 308 from the list, the external device 104 does not synchronize the password information that is the personal setting of the extension password information management unit 308, which is the application that is not included in the list. Thereafter, the processing transitions to step S803.

Because step S803 to step S804 are similar to step S409 to step S410 of FIG. 5 described above, description thereof is omitted.

As described above, a program relating the personal setting that is not synchronized with that of the external device is deleted from the application list that is transmitted to the external device 104 when the image forming apparatus 101 is activated. For example, in the case where the password information is not synchronized, the information of the extension password information management unit 308 can be deleted from the application list. As a result, the external apparatus 104 determines that the extension password information management unit 308 is not present in the image forming apparatus 101, and does not perform overall synchronization of the password information. Accordingly, it is possible to prohibit synchronization without operating the synchronous control flag with Ver3.2, for example.

Fifth Embodiment

This embodiment is an embodiment in the case where when the version of firmware is changed due to distribution or firmware updating in the case where an application can freely select synchronous control of personal settings, synchronous control is changed as appropriate. In order to simplify description, the relationship between synchronous control and the version of firmware is assumed as follows.
Ver3.2: do not synchronize
Ver3.3: synchronize
Ver3.4: application can select whether synchronization is performed.

In Embodiments 2 and 3 described above, synchronous control is changed as appropriate by rewriting the synchronous control flag at the time of distribution or firmware updating. When an application can freely select ON and OFF of the synchronous control flag in the Ver3.4 as in the present embodiment, if the password information of the Ver3.4 is distributed to the Ver3.3 or Ver3.2, it is desirable to give priority to the designation of the application. However, with the methods of Embodiments 2 and 3, all of flags are rewritten in accordance with the version of firmware, and thus it is not possible to give priority to the designation of the application. In view of this, in the present embodiment, making a mark on the synchronous control flag operated intentionally by the application (or the user of the application, which is similarly applied to the following) makes it possible to give priority on the designation of the application when the synchronous control flag is rewritten in accordance with the firmware version. Because the system configuration, hardware configuration, and software configuration of the present embodiment are similar to those in the first embodiment, description thereof is omitted.

Figure 14:
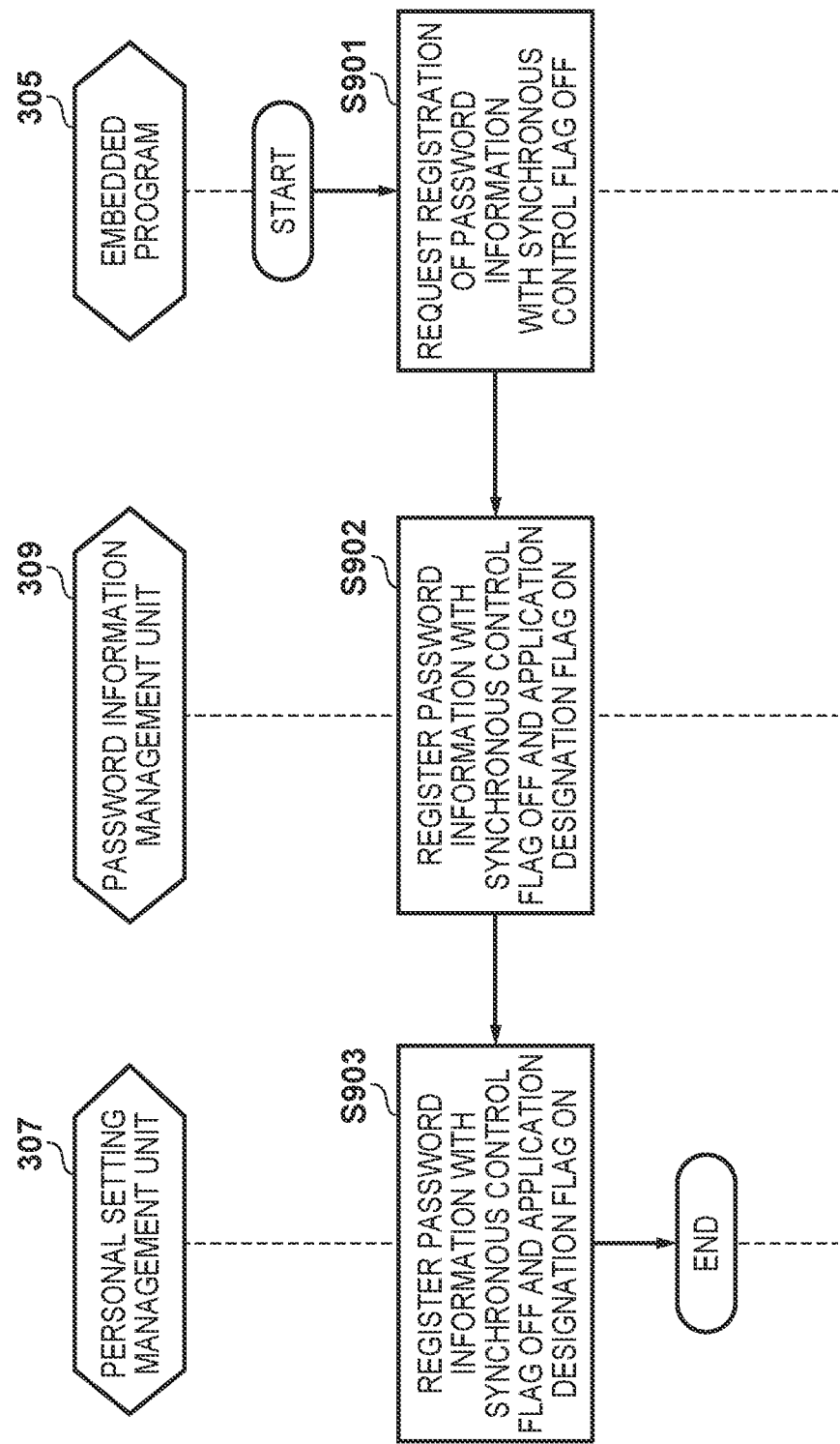
FIG. 14 is a flowchart when information of the extension password information management unit is deleted from the application list in the third embodiment.
Figure 15:
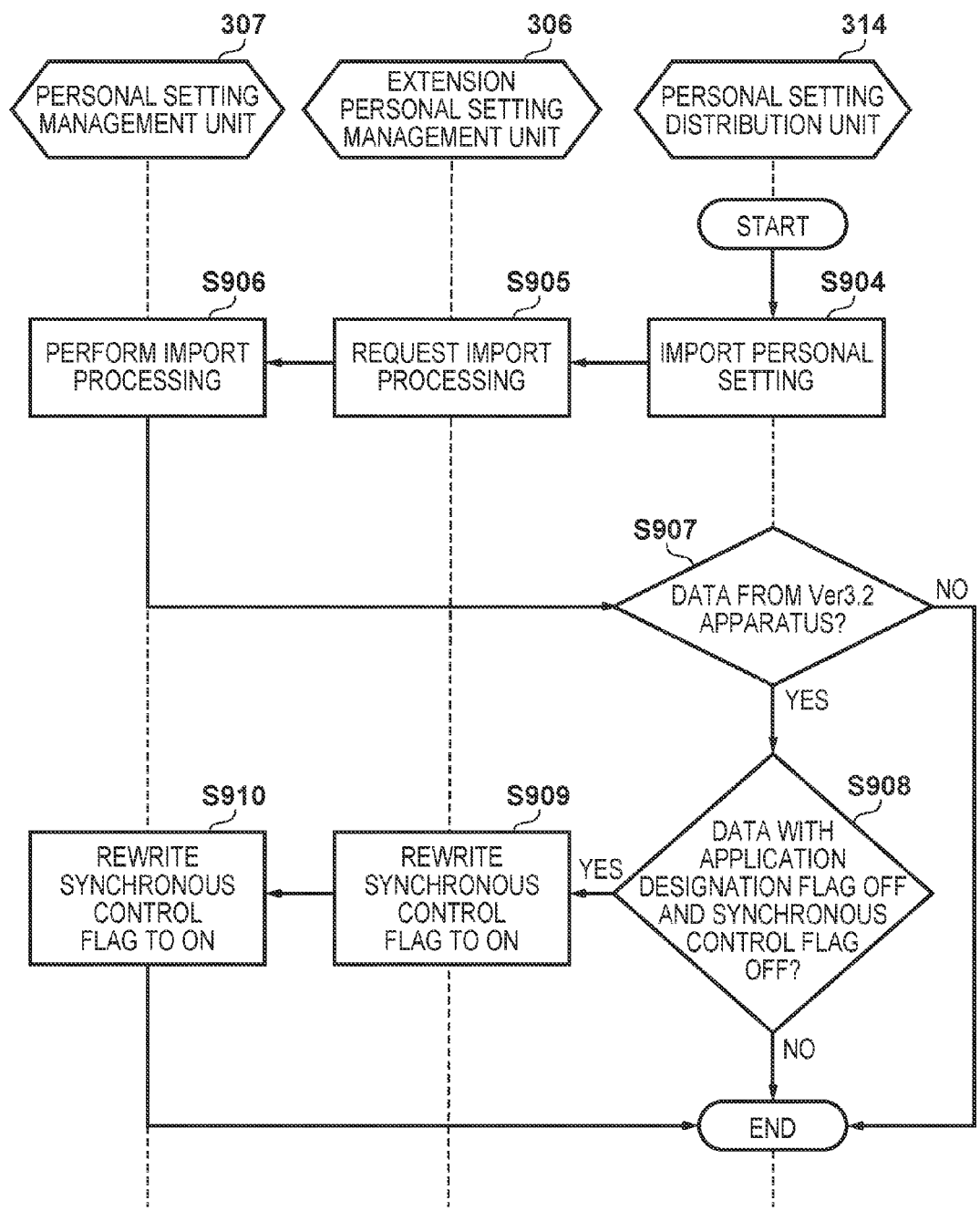
FIG. 15 is a flowchart when a synchronous control flag is rewritten in accordance with the version of firmware with respect for the intention of an application, in a case where the application operates the synchronous control flag in a fourth embodiment.

FIGS. 14 and 15 are flowcharts illustrating the flow for rewriting the synchronous control flag in accordance with the firmware version at the time of distribution or firmware updating, while respecting synchronous control designated intentionally by the application. FIG. 14 is a flowchart illustrating the flow in the case where when registering password information, the application provides a flag indicating that the synchronous control flag is intentionally operated. In FIG. 14, the processing starts from the step of the embedded program 305 registering the password information, and ends with the step of the personal setting management unit 307 registering the password information in the personal setting holding unit 311.

Step S901 is the step of the embedded program 305 registering the password information. The embedded program 305 intentionally changes whether or not synchronization is performed, by operating the synchronous control flag at the time of registration of the password information. Upon receiving the registration from the embedded program 305, in step S902, the personal setting management unit 309 provides a flag (also referred to as application designation flag or operation information, hereinafter) indicating that the application has intentionally operated the synchronous control flag. The fact that the application has intentionally operated the synchronous control flag can be determined with the configuration such that changing settings is performed by calling a function for a predetermined setting or the like, with the setting being prohibited from being changed by directly accessing a memory, for example. Independent of a setting value, calling the function for the setting makes it possible to determine that the application that calls the function has operated the synchronous control flag. Also, which personal setting is related to the set synchronous control flag can be specified by being given as the parameter to a function for setting. Of course, this is merely an example, and any method can be used as long as performing an operation for the synchronous control flag, which is the operation target, and the flag can be specified.

Step S902 is the step of the password information management unit 309 giving an instruction to register the password information in the personal setting management unit 307. In order to indicate that an instruction for operating the synchronous control flag has been given from the application in step S901 described above, the password information management unit 309 provides an application designation flag with the synchronous control flag. The personal setting management unit 307 then registers the password information in the personal setting holding unit 311 in the next step S903.

Step S903 is the step of the personal setting management unit 307 registering the password information in the personal setting holding unit 311. The synchronous control flag operated by the embedded program 305 in step S901 described above and the application designation flag that the password information management unit 309 provides in step S902 are both registered in the password information.

As described above, when the application registers the password information and operates the synchronous control flag, the application designation flag is provided and then the flag can be distinguished later.

Next, FIG. 15 will be described. FIG. 15 is a flowchart illustrating the flow of processing in the case where the password information is imported. In FIG. 15, the processing starts from the step of the personal setting distribution unit 314 giving an instruction to import a personal setting, and ends with the step of the personal setting management unit 307 rewriting a synchronous control flag. Although with regard to the personal setting distributed from the Ver3.2, the synchronous control flags have been operated equally in the first embodiment, in the case where the application intentionally operates the synchronous control flag as in Ver3.4, it is desirable to rewrite the flag with respect given to the operation. Although it was determined whether the synchronous control flag has been rewritten, only with the version of the distribution source in the second embodiment, if the password information of the Ver3.4 has been distributed to the Ver3.3 via the Ver3.2, it is not possible to make a determination with the version of the distribution source. Thus, the synchronous control flag operated intentionally by the application is distinguished by utilizing the application designation flag described in FIG. 14 described above. Because step S904 to step S907 are similar to step S609 to step S612 in FIG. 11, description thereof is omitted.

In the case of importing from the image forming apparatus having the version 3.2 firmware, step S908 is the step of the personal setting distribution unit 314 checking the application designation flag and the synchronous control flag. As described in the second embodiment, at the time of importing, it is necessary to rewrite the synchronous control flag in accordance with a difference in the firmware version between the distribution source and the distribution destination. However, the same is not applied to the personal setting on which the application intentionally performs the synchronous control. In view of this, both the synchronous control flag and the application designation flag are checked in this step S908, and only in the case where the application does not intentionally perform operation, the synchronous control flag is rewritten in accordance with the firmware version. In the case where the application designation flag is off and the personal setting having the synchronous control flag off is present, the processing transitions to step S909, otherwise this flowchart ends. Step S909 is the step of the extension personal setting management unit 306 rewriting the synchronous control flag. That is, the synchronous control flag is rewritten in accordance with the firmware version only in the case where the synchronous control flag is not operated by the application and the synchronous control flag is off.

Step S910 is the step of the personal setting management unit 307 rewriting the synchronous control flag. The import processing is completed in this step S910, and the flowchart ends.

As described above, it is possible to rewrite the synchronous control flag in accordance with the firmware version while respecting the intention of the application. Also, rewriting the flag after checking the application designation flag, similarly when the firmware is updated, makes it possible to rewrite the synchronous control flag in accordance with the firmware version while prioritizing the designation of the application.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such changes and equivalent structures and functions.

This application claims the benefit of Japanese Patent Application No. 2015-041778, filed Mar. 3, 2015, which is hereby embedded by reference herein in its entirety.

What is claimed is:

1. An image forming apparatus configured to be connected to an external apparatus, comprising:
at least one processor; and
at least one memory,
wherein said at least one processor, when executing instructions stored in the at least one memory, is configured to function as:
a storing unit configured to store a personal setting of each program in association with synchronous control information,
a synchronization management unit configured to synchronize the personal setting stored in the storing unit and a corresponding personal setting held in the external apparatus, in accordance with the synchronous control information associated with the personal setting, the synchronous control information indicating whether or not the personal setting associated with the synchronous control information is synchronized with the personal setting held in and to be imported from the external apparatus, and
an import unit configured to import the synchronous control information in association with the personal setting, when the personal setting is imported from another information processing apparatus,
wherein if the synchronous control information imported from the other information processing apparatus indicates that the personal setting is not synchronized and the synchronous control information has not been specified by an application, the import unit rewrites the synchronous control information so as to indicate that the personal setting associated with the synchronous control information is synchronized.

2. The image forming apparatus according to claim 1, wherein said at least one processor is further configured to function as:
an export unit configured to export the synchronous control information in association with the personal setting, when the personal setting is exported to a distribution destination,
wherein the export unit is configured to add information indicating a synchronous control method to the personal setting to be exported, and
wherein the import unit is configured to set, in a case where the information indicating the synchronous control method is added to the personal setting that is imported, synchronous control information associated with the personal setting such that the synchronous control method indicated by the information is implemented.

3. The image forming apparatus according to claim 2, wherein the information indicating the synchronous control method is version information of firmware of the image forming apparatus, which is the distribution source.

4. The image forming apparatus according to claim 3, wherein said at least one processor is further configured to function as:
a unit configured to store version information of firmware when the image forming apparatus was last activated,
wherein current version information at the time of activation and the version information at the time of the last activation are compared with each other, and if the current version information is not identical to the version information at the time of the last activation, the synchronous control information is set to a value in accordance with the current version information.

5. The image forming apparatus according to claim 2, wherein said at least one processor is further configured to function as:

a unit configured to set, in a case where the personal setting is operated by an application program, the application designation information indicating that the personal setting has been operated by the application program, wherein the storing unit is configured to store the set application designation information in association with the synchronous control information, and wherein the export unit is configured to export the personal setting associated with the application designation information and the synchronous control information.

6. The image forming apparatus according to claim 1, wherein the external apparatus is configured to transmit the personal setting for each program to the image forming apparatus based on a list of programs that is received from the image forming apparatus, and wherein said at least one processor is further configured to function as a unit configured to transmit, to the external apparatus, the list of programs that does not include a program having a personal setting that is not to be synchronized.

7. The image forming apparatus according to claim 1, wherein the personal setting includes password information for accessing the external apparatus with the program.

8. A method for controlling an image forming apparatus configured to be connected to an external apparatus, the method comprising:

storing a personal setting of each program in a storing unit in association with synchronous control information;

synchronizing the personal setting stored in the storing unit and a corresponding personal setting held in the external apparatus, in accordance with the synchronous control information associated with the personal setting, the synchronous control information indicating whether or not the personal setting associated with the synchronous control information is synchronized with the personal setting held in and to be imported from the external apparatus; and importing the synchronous control information in association with the personal setting, when the personal setting is imported from another information processing apparatus, wherein if the synchronous control information imported from the other information processing apparatus indicates that the personal setting is not synchronized and the synchronous control information has not been specified by an application, the synchronous control information is rewritten so as to indicate that the personal setting associated with the synchronous control information is synchronized.

9. The method for controlling the image forming apparatus according to claim 8, wherein the synchronous control information is imported in association with the personal setting when the personal setting is imported from a distribution source.

10. A non-transitory computer-readable recording medium having recorded thereon a program for causing a computer to function as an image forming apparatus which is configured to be connected to an external apparatus and which comprises at least one processor and at least one memory, the at least one processor, when executing instructions stored in the at least one memory, being configured to function as:

a storing unit configured to store a personal setting of each program in association with synchronous control information;

a synchronization management unit configured to synchronize the personal setting stored in the storing unit and a corresponding personal setting held in the external apparatus, in accordance with the synchronous control information associated with the personal setting, the synchronous control information indicating whether or not the personal setting associated with the synchronous control information is synchronized with the personal setting held in and to be imported from the external apparatus, and an import unit configured to import the synchronous control information in association with the personal setting, when the personal setting is imported from another information processing apparatus, wherein if the synchronous control information imported from the other information processing apparatus indicates that the personal setting is not synchronized and the synchronous control information has not been specified by an application, the import unit rewrites the synchronous control information so as to indicate that the personal setting associated with the synchronous control information is synchronized.

* * * * *